(12) United States Patent
Inomoto et al.

(10) Patent No.: US 9,979,852 B2
(45) Date of Patent: May 22, 2018

(54) IMAGE READING APPARATUS

(71) Applicant: Konica Minolta, Inc., Chiyoda-ku, Tokyo (JP)

(72) Inventors: Toshinori Inomoto, Toyokawa (JP); Yasuhiro Ishihara, Toyohashi (JP); Toshiaki Tanaka, Toyokawa (JP); Satoshi Chikazawa, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/447,902

(22) Filed: Mar. 2, 2017

(65) Prior Publication Data
US 2017/0264771 A1 Sep. 14, 2017

(30) Foreign Application Priority Data

Mar. 11, 2016 (JP) .................................. 2016-048430

(51) Int. Cl.
*H04N 1/04* (2006.01)
*H04N 1/028* (2006.01)
*H04N 1/00* (2006.01)

(52) U.S. Cl.
CPC ..... *H04N 1/02865* (2013.01); *H04N 1/00734* (2013.01); *H04N 1/0285* (2013.01);
(Continued)

(58) Field of Classification Search
CPC ........... H04N 1/00204; H04N 1/00249; H04N 1/00267; H04N 1/0027; H04N 1/00416; H04N 1/0044; H04N 1/00448; H04N 1/00453; H04N 1/00461; H04N 1/12; H04N 1/193; H04N 1/40056; H04N 1/6027; H04N 2201/322
(Continued)

(56) References Cited

U.S. PATENT DOCUMENTS 5,114,236 A * 5/1992 Matsugu ............... G03F 9/7076
250/548
6,014,234 A * 1/2000 Yamamoto ......... H04N 1/40056
358/474
(Continued)

FOREIGN PATENT DOCUMENTS

JP 07-250212 A 9/1995

*Primary Examiner* — Negussie Worku
(74) *Attorney, Agent, or Firm* — Buchanan Ingersoll & Rooney PC

(57) ABSTRACT

An image reading apparatus includes: three or more light sources configured to each emit light; a light receiving unit including a common light receiving surface configured to detect each light emitted; and an image generation unit configured to cause the three or more light sources to be switched over in a predetermined order and emit the corresponding light, and generate an image read from a document, wherein at least one of the three or more light sources includes a white light source and an optical filter, and the optical filter is configured such that a half-value width of a wavelength with respect to a maximum intensity of a spectral characteristic of the emitted light after transmission is wider than a half-value width of a wavelength with respect to a maximum intensity of the spectral characteristic of the light emitted from at least one of the other light sources.

13 Claims, 18 Drawing Sheets

(52) U.S. Cl.
CPC ..... *H04N 1/02855* (2013.01); *H04N 1/02895* (2013.01); *H04N 1/04* (2013.01); *H04N 2201/0094* (2013.01)

(58) Field of Classification Search
USPC ......... 382/224, 171, 173, 190, 199; 358/2.1, 358/474, 475, 505, 522, 534
See application file for complete search history.

(56) References Cited

U.S. PATENT DOCUMENTS

| | | | | |
|---|---|---|---|---|
| 6,297,874 B1* | 10/2001 | Ikeda | ..................... | G03B 17/24 355/40 |
| 6,771,401 B2* | 8/2004 | Chen | ..................... | H04N 1/484 250/208.1 |
| 7,916,365 B2* | 3/2011 | Sekiya | ................. | H04N 1/4076 358/1.1 |
| 9,389,553 B2* | 7/2016 | Yamamoto | ......... | G03G 15/2039 |
| 9,423,731 B2* | 8/2016 | Tanaka | ................ | G03G 15/2039 |
| 9,656,821 B2* | 5/2017 | Kato | ...................... | B65H 7/125 |
| 9,799,122 B2* | 10/2017 | Komatsu | .................. | G06T 7/20 |
| 2004/0001632 A1* | 1/2004 | Adachi | ................ | G06K 9/6814 382/224 |
| 2006/0001924 A1* | 1/2006 | Tatarczyk | ........... | B41F 33/0036 358/509 |
| 2008/0013133 A1* | 1/2008 | Taguchi | ................. | H04N 1/393 358/514 |
| 2009/0207450 A1* | 8/2009 | Nagamochi | ........ | G01D 5/34746 358/2.1 |
| 2010/0245952 A1* | 9/2010 | Muraishi | .............. | H04N 1/0035 358/505 |
| 2013/0144120 A1* | 6/2013 | Yamazaki | ......... | H01L 27/14643 600/109 |
| 2016/0194168 A1* | 7/2016 | Kato | ..................... | B65H 7/125 271/265.02 |

* cited by examiner

FIG. 5
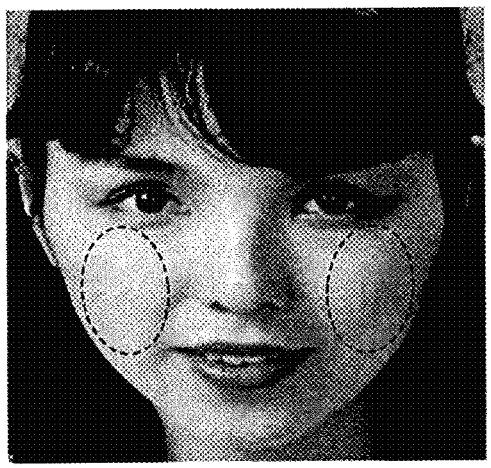
ONE-LINE CIS
THREE-LINE CIS

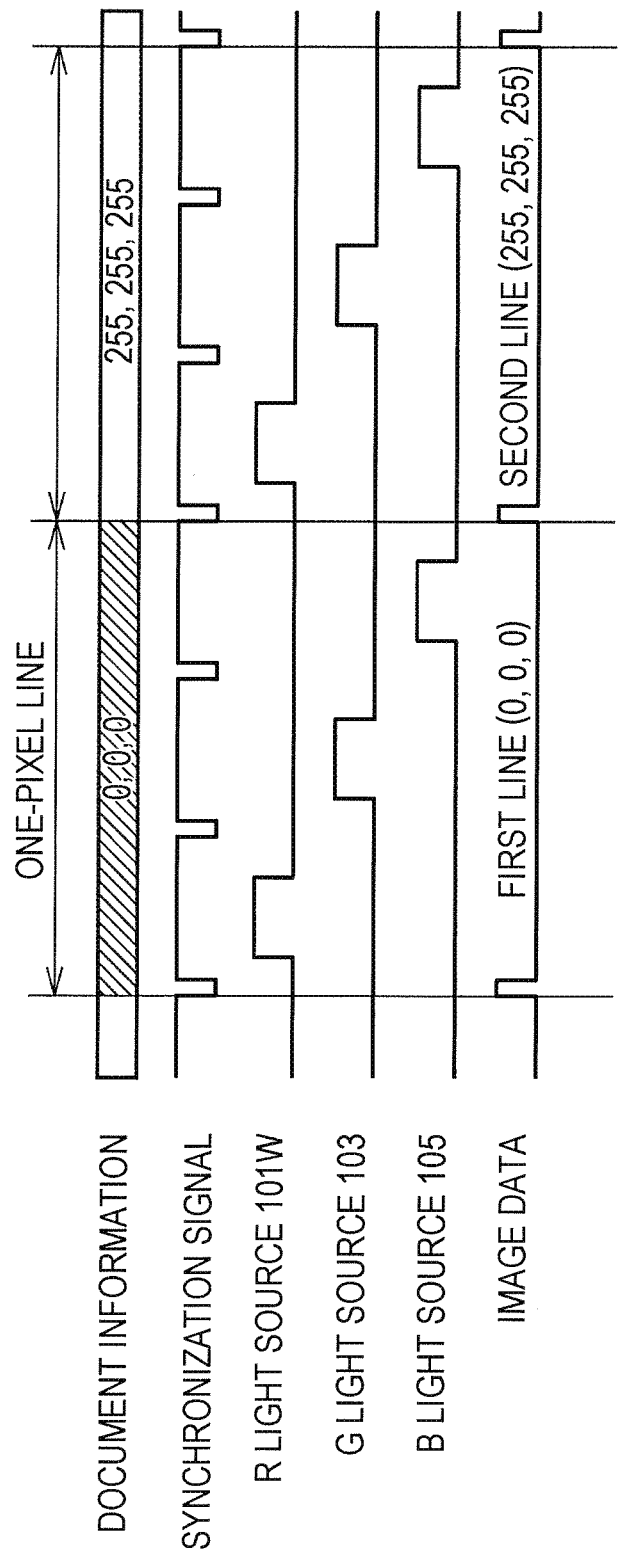

IMAGE READING APPARATUS

The entire disclosure of Japanese Patent Application No. 2016-048430 filed on Mar. 11, 2016 including description, claims, drawings, and abstract are incorporated herein by reference in its entirety.

BACKGROUND OF THE INVENTION

Field of the Invention

The present disclosure relates to an image reading apparatus. More specifically, the present disclosure relates to an image reading apparatus capable of reading color images.

Description of the Related Art

Image reading systems for image reading apparatuses can be broadly classified into two systems: a charge coupled device (CCD), which is an optical reduction system, and a contact image sensor (CIS) system. Of the two systems, the CIS system can be further classified into two types. One type separates red, green, and blue light on a light projecting side and irradiates an object to be read such as a document with light. The other type separates light reflected from the object being read into red, green, and blue on a light receiving side.

The type that separates light into red, green, and blue on the light receiving side includes three reading sensors. The reading sensors include individual optical filters that separate the light into respective colors: red, green, and blue. In this way, an image separated from the object being read into each color, red, green, and blue, is obtained by the corresponding reading sensor.

By contrast, the type that separates red, green, and blue light on the light projecting side includes one reading sensor. By switching over red, green, and blue light sources consecutively, the corresponding light is emitted toward the object to be read. In this way, each time one of the light sources is illuminated, an image separated from the object being read into the corresponding color, red, green, or blue, is obtained by the reading sensor.

The type that separates red, green, and blue light on the light projecting side can serve to reduce manufacturing costs, since the number of reading sensors and optical filters used in this type is fewer than that in the type that separates light into red, green, and blue on the light receiving side.

The CIS system that separates red, green, and blue light on the light projecting side is disclosed in JP 07-250212 A (Patent Document 1). The configuration disclosed therein includes a white light source, a light shielding member, a cylindrical filter, and a drive section. The white light source illuminates a document. The light shielding member is disposed around the white light source and includes a slit at a position corresponding to the document. The cylindrical filter is arranged around the light shielding member and includes three primary colors of R, G, and B filters regularly and sequentially arranged therein in a circumferential direction. The drive section drives and controls the rotation of the filter so as to cause each of the R, G, and B filters to consecutively face the document surface in synchronization with the conveyance of the document.

However, the technique disclosed in JP 07-250212 A needs to include the cylindrical filter including R, G, and B optical filters around the white light source as well as the drive section that rotates the filter. Therefore, the technique may have an issue that not only does the size of an apparatus itself increase, but also manufacturing costs thereof increase.

SUMMARY OF THE INVENTION

The present disclosure has been made to solve the issue as described above. An object of one aspect is to provide an image reading apparatus that obtains, from an object being read, an image separated into each color, red, green, and blue, in a simpler configuration than before.

To achieve the abovementioned object, according to an aspect, an image reading apparatus reflecting one aspect of the present invention comprises: three or more light sources configured to each emit, to a document to be read, light having a spectral characteristic different from one another; a light receiving unit including a common light receiving surface configured to detect each light emitted from the three or more light sources and reflected from the document; and an image generation unit configured to cause the three or more light sources to be switched over in a predetermined order and emit the corresponding light, and generate an image read from the document on the basis of the order of switchover, a detection result in the light receiving unit, and the spectral characteristic of each light emitted from the three or more light sources, wherein at least one of the three or more light sources includes a white light source and an optical filter disposed in the white light source, and the optical filter is configured such that a half-value width of a wavelength with respect to a maximum intensity of a spectral characteristic of the emitted light after transmission is wider than a half-value width of a wavelength with respect to a maximum intensity of the spectral characteristic of the light emitted from at least one of the other light sources.

The image reading apparatus preferably further comprises a superimposing light source configured to emit light having a spectral characteristic in which a wavelength at a maximum intensity thereof is within a wavelength range that the optical filter transmits. The image generation unit preferably causes not only the white light source but also the superimposing light source to be illuminated.

The white light source and the superimposing light source are preferably arranged so as to be adjacent to one another. The white light source and the superimposing light source are preferably configured such that a maximum intensity of a spectral characteristic of light obtained by combining the light emitted and transmitted through the optical filter and the light emitted from the superimposing light source is substantially equal to the maximum intensity of the spectral characteristic of the light emitted from at least one of the other light sources.

The optical filter preferably transmits light of at least 550 nm to 700 nm.

The white light source is preferably configured such that an intensity thereof at least in a range from 550 nm to 700 nm exceeds a half of the maximum intensity of the light of at least one of the other light sources.

The optical filter preferably transmits light of at least 500 nm to 580 nm.

The white light source is preferably configured such that an intensity thereof at least in a range from 500 nm to 580 nm exceeds a half of the maximum intensity of the light of at least one of the other light sources.

The image reading apparatus preferably further comprises: a light guide configured to guide each light emitted from the three or more light sources to the document; and an image forming lens configured to cause each light emitted from the three or more light sources and reflected from the document to form an image on the light receiving surface.

The optical filter is preferably interposed between the three or more light sources and the light guide. The optical filter is preferably disposed over a surface of the white light source.

To achieve the abovementioned object, according to an aspect, an image reading apparatus reflecting one aspect of the present invention comprises three light sources configured to generate light each including a wavelength component corresponding to red, green, or blue; a light receiving unit including a common light receiving surface configured to detect each light emitted, at different timing from one another, from the three light sources to a document to be read and then reflected from the document; and an image generation unit configured to cause the three light sources to be switched over in a predetermined order and emit the corresponding light, and generate an image read from the document on the basis of the order of switchover, a detection result in the light receiving unit, and a spectral characteristic of each light emitted from the three light sources, wherein among the three light sources, the light source configured to generate the light including the wavelength component corresponding to red is configured such that an intensity thereof at least in a range from 550 nm to 700 nm exceeds a half of a maximum intensity of the light of at least one of the other light sources.

To achieve the abovementioned object, according to an aspect, an image reading apparatus reflecting one aspect of the present invention comprises three light sources configured to generate light each including a wavelength component corresponding to red, green, or blue; a light receiving unit including a common light receiving surface configured to detect each light emitted, at different timing from one another, from the three light sources to a document to be read and then reflected from the document; and an image generation unit configured to cause the three light sources to be switched over in a predetermined order and emit the corresponding light, and generate an image read from the document on the basis of the order of switchover, a detection result in the light receiving unit, and a spectral characteristic of each light emitted from the three light sources, wherein among the three light sources, the light source configured to generate the light including the wavelength component corresponding to green is configured such that an intensity thereof at least in a range from 500 nm to 580 nm exceeds a half of a maximum intensity of the light of at least one of the other light sources.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a pair of photographs for comparing a document image read by the image reading apparatus according to the related art with the document image read by the image reading apparatus according to the other related art;

FIG. 11 is a diagram illustrating processing of an image generation unit according to the first embodiment;

DESCRIPTION OF THE PREFERRED EMBODIMENTS

Figure 1:
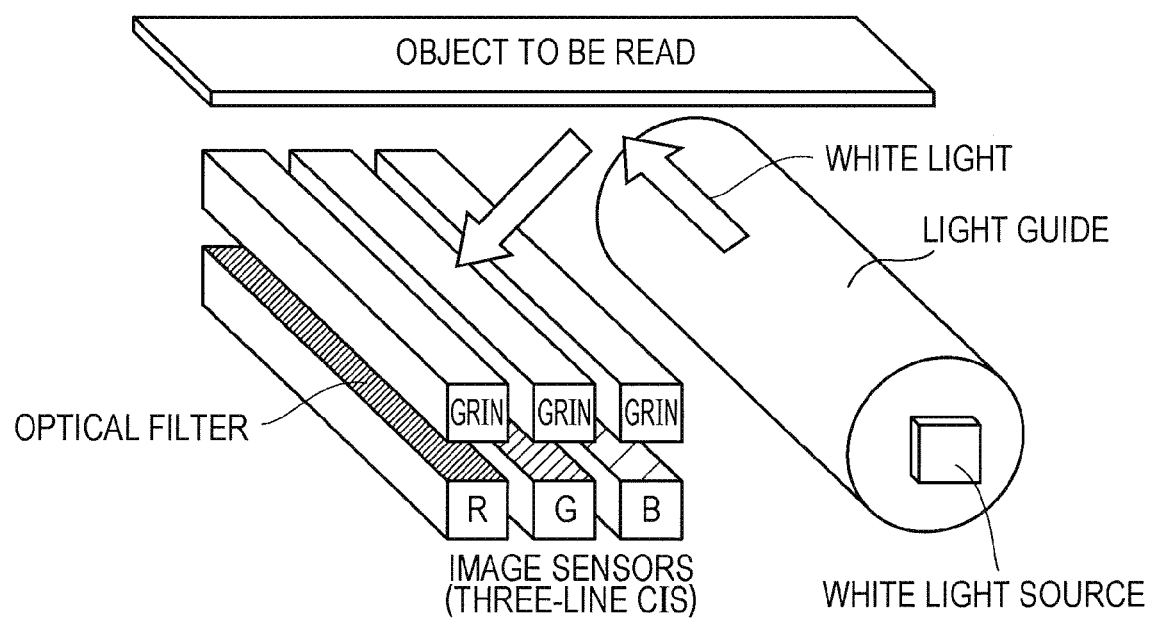
FIG. 1 is a diagram illustrating an image reading apparatus according to a related art.

Hereinafter, an embodiment of the present invention will be described in detail with reference to the drawings. However, the scope of the invention is not limited to the illustrated examples. In the drawings, the same or corresponding portions are denoted with same reference signs, and the duplicate descriptions thereof will be omitted.

[A. Related Art ]

(a1. Three-Line CIS System)

FIG. 1 is a diagram illustrating an image reading apparatus 38X in a three-line CIS system according to a related art. With reference to FIG. 1, the image reading apparatus 38X according to the related art includes a white light source, a light guide, three image sensors (three-line CIS), three graded index (GRIN) lenses, optical filters that transmit wavelengths corresponding to their respective colors: red, green, and blue (hereinafter, referred to as "R, G, and B").

A document to be read is irradiated with light from the white light source through the light guide. The light that is reflected from the document being conveyed is converged by the GRIN lenses. The converged light is then transmitted through the R, G, and B optical filters, and enters each of the image sensors.

By combining R, G, and B components read by each image sensor, the image reading apparatus 38X generates image data of the object being read.

Figure 2A:
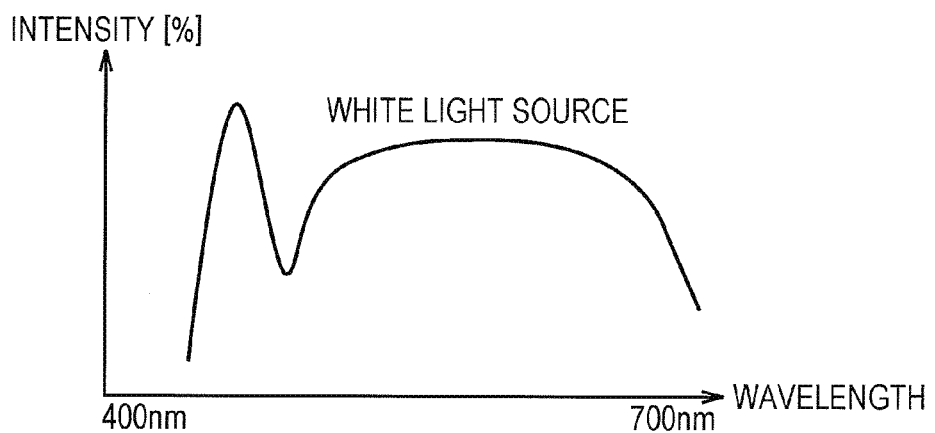
FIGS. 2A to 2C are graphs illustrating a spectral characteristic of light from a white light source as well as a spectral characteristic of light obtained by combining each light transmitted through a corresponding optical filter of the image reading apparatus according to the related art.
Figure 2B:
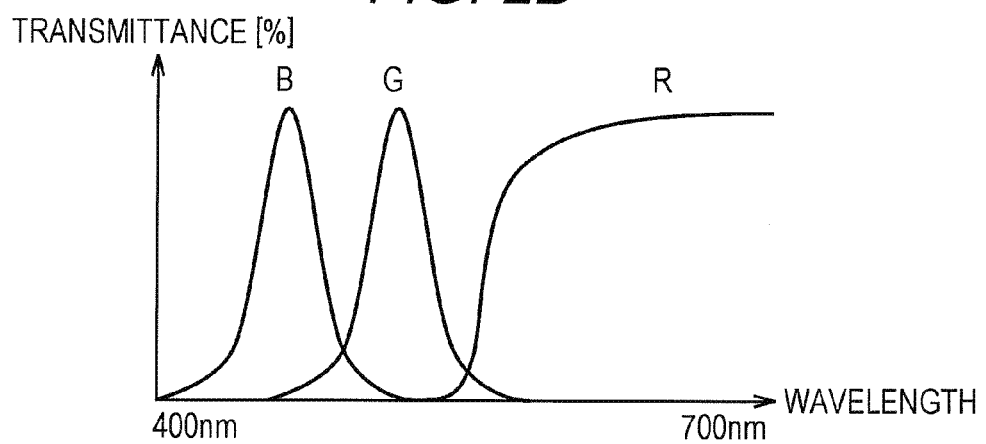
Figure 2C:
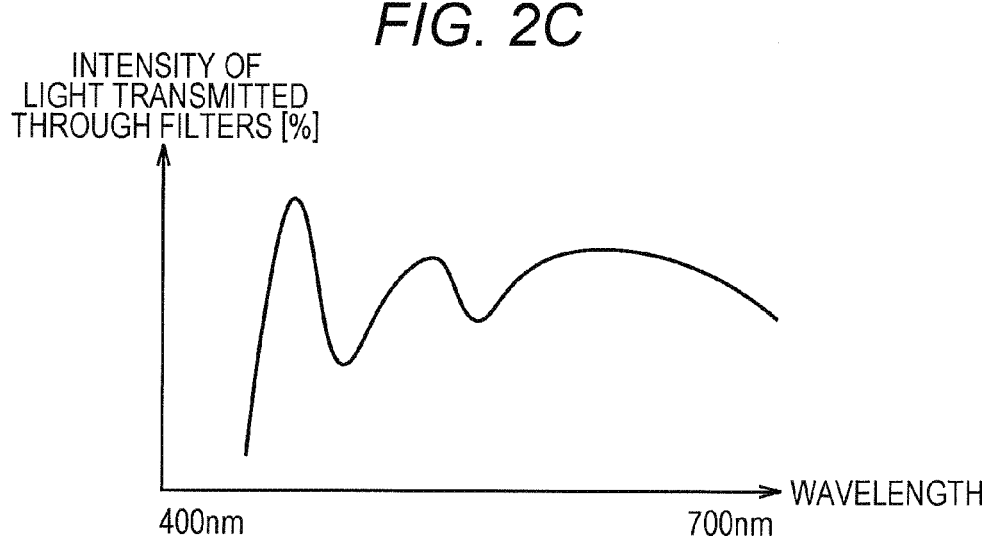

FIGS. 2A to 2C are graphs illustrating a spectral characteristic of the light from the white light source as well as a spectral characteristic of light obtained by combining each light transmitted through the corresponding optical filter of the image reading apparatus 38X according to the related art. With reference to FIG. 2A, the light of the white light source in the image reading apparatus 38X exhibits a spectral characteristic including a wide wavelength component that spans a visible light range. Therefore, each light transmitted through the corresponding one of the R, G, and B optical filters and received by the corresponding image sensor also includes a wide wavelength component. A transmission characteristic of each optical filter is illustrated in FIG. 2B.

As a result, as illustrated in FIG. 2C, the spectral characteristic of the light obtained by combining each light transmitted through the corresponding optical filter has, over the visible light range, sufficient intensity to read colors included in the document. Therefore, the image reading apparatus 38X according to the related art has high color reproducibility.

However, since the image reading apparatus 38X according to the related art includes the three image sensors (three-line CIS) and their respective optical filters, there may be an issue that material costs are high.

(a2. One-Line CIS System)

Figure 3:
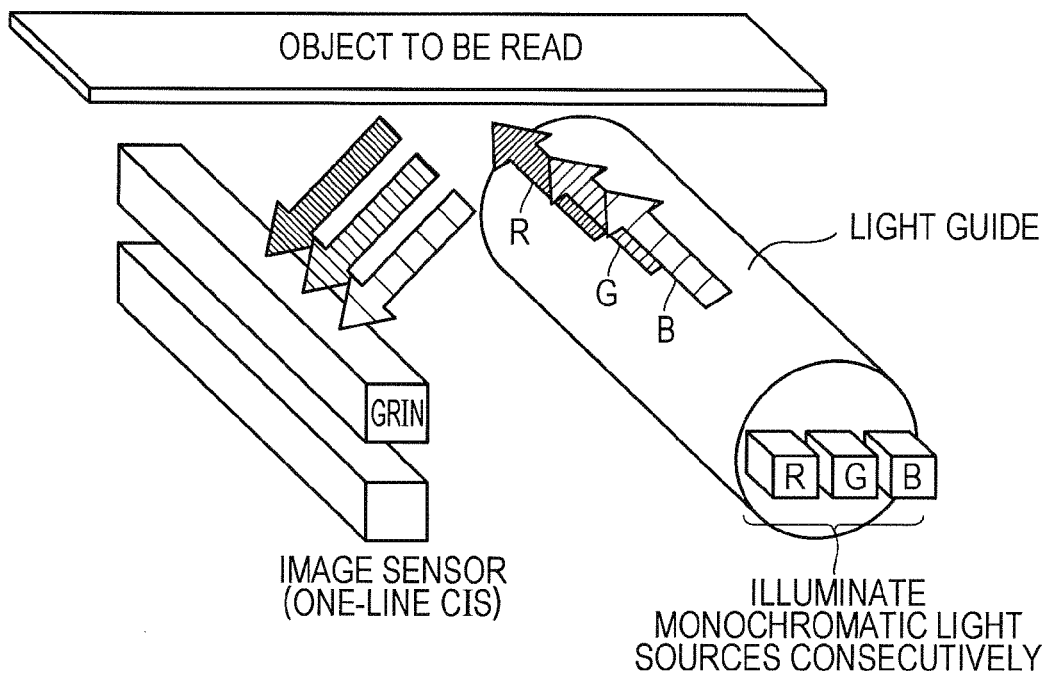
FIG. 3 is a diagram illustrating an image reading apparatus according to another related art.

Accordingly, using a single image sensor (one-line CIS) to read image components corresponding to R, G, and B may be another possible configuration. FIG. 3 is a diagram illustrating an image reading apparatus 38Y in the one-line CIS system according to another related art.

The image reading apparatus 38Y includes three light sources, a light guide, a GRIN lens, and an image sensor. Each R, G, and B light is generated by the corresponding one of the three light sources. The light guide guides each light emitted from these light sources to a document to be read.

The image reading apparatus 38Y causes the three R, G, and B light sources to be switched over and illuminated consecutively. In synchronization with the switchover timing of the light sources, the image sensor consecutively reads each of the image components corresponding to R, G, and B.

With the configuration above, the image reading apparatus 38Y is able to generate image data of an object being read with a single image sensor. Such a simple configuration can therefore serve to reduce costs.

With this configuration, light emitting diodes (LEDs) are used for the three light sources. Each light source generates its corresponding light, R, G, or B. The reason for using LEDs is due to their characteristics such as compact size, low cost, and high efficiency.

Figure 4:
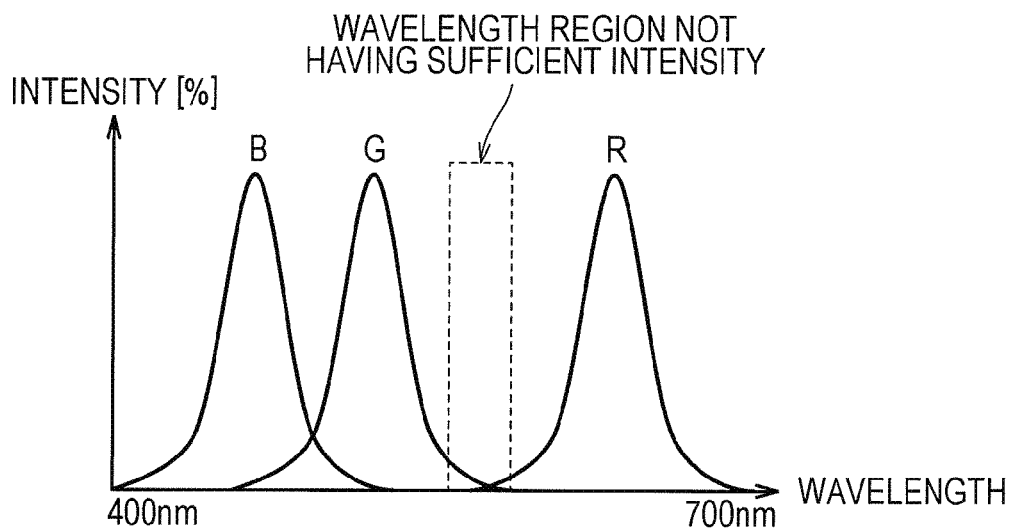
FIG. 4 is a graph illustrating a spectral characteristic of each light to be read by the image reading apparatus according to the other related art.

However, since LEDs are highly efficient, light emitted by an LED exhibits an extremely sharp spectral characteristic compared to a white light source such as a halogen lamp, and thus the intensity thereof is high at a specific wavelength. Therefore, as illustrated in FIG. 4, in a case where a monochromatic LED is used for each of the R, G, and B light sources, there exists a wavelength range which does not have sufficient intensity to read colors included in the document. Consequently, the image reading apparatus 38Y is unable to accurately reproduce the colors included in the document and corresponding to the above-described wavelength range.

As an example, a wavelength corresponding to the maximum intensity of each of the R, G, and B LEDs is assumed to be 630 nm, 520 nm, and 460 nm, respectively, and a full width at half maximum is 20 nm each. In this case, a wavelength interval between the maximum intensity of the R light source (red LED) and the maximum intensity of the G light source (green LED) is 110 nm, and the intensities in a range from 530 nm to 620 nm are equal to or less than half the respective maximum intensities. In this range, the intensity of each of the light sources is particularly low in the vicinity of 570 nm which is at the midpoint between the maximum intensity of the R light source and the maximum intensity of the G light source. Therefore, the sensitivity with respect to the colors that are included in the document and in the vicinity of 570 nm is low in the image reading apparatus 38Y. In other words, there may be an issue that the color reproducibility in the vicinity of 570 nm is low.

FIG. 5 is a pair of photographs for comparing image data read by the image reading apparatus 38X (three-line CIS system) with image data read by the image reading apparatus 38Y (one-line CIS system). As illustrated in FIG. 5, particularly in the portions indicated by broken lines, the image data read by the one-line CIS system and the image data read by the three-line CIS system differ from one another in terms of colors (which is represented by shading in monochrome images). This is because the reproducibility of colors such as beige and orange is low in the one-line CIS system since the intensity of the wavelength component in the vicinity of 570 nm is low, as described above.

[B. Overview]

In view of the foregoing, the following describes a configuration for realizing an image reading apparatus with high color reproducibility and simple configuration even in a one-line CIS system.

For each of the R, G, and B light sources, the image reading apparatus 38Y uses a light source (e.g., LED) with which a half-value width of a wavelength with respect to the maximum intensity is narrow, whereby the intensity in the vicinity of 570 nm is low. Accordingly, the color reproducibility in the vicinity of 570 nm is low in the image reading apparatus 38Y.

Therefore, the image reading apparatus according to the present embodiment includes a light source that has sufficient intensity even in a wavelength range in the vicinity of 570 nm. In this way, the image reading apparatus is able to improve the reproducibility of colors included in a document and corresponding to the above-described wavelength range.

Figure 6A:
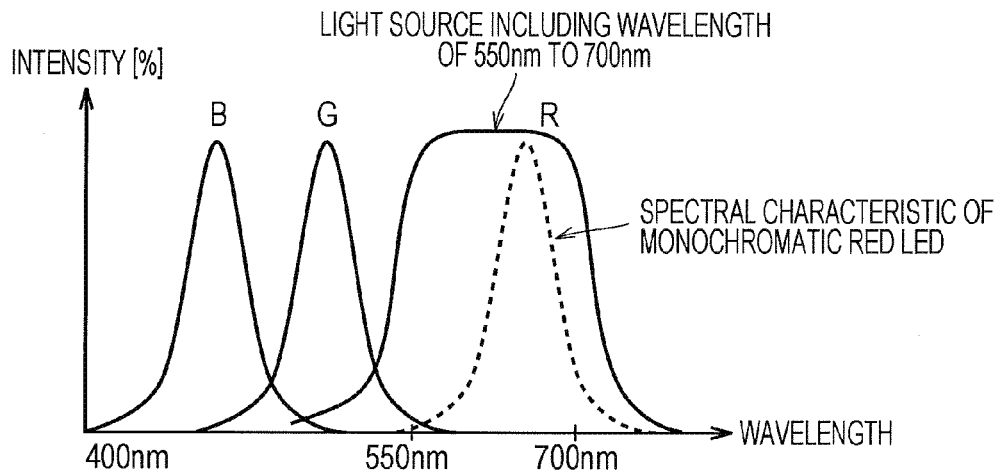
FIGS. 6A to 6C are graphs illustrating an overview (red) of an image reading apparatus according to an embodiment.
Figure 6B:
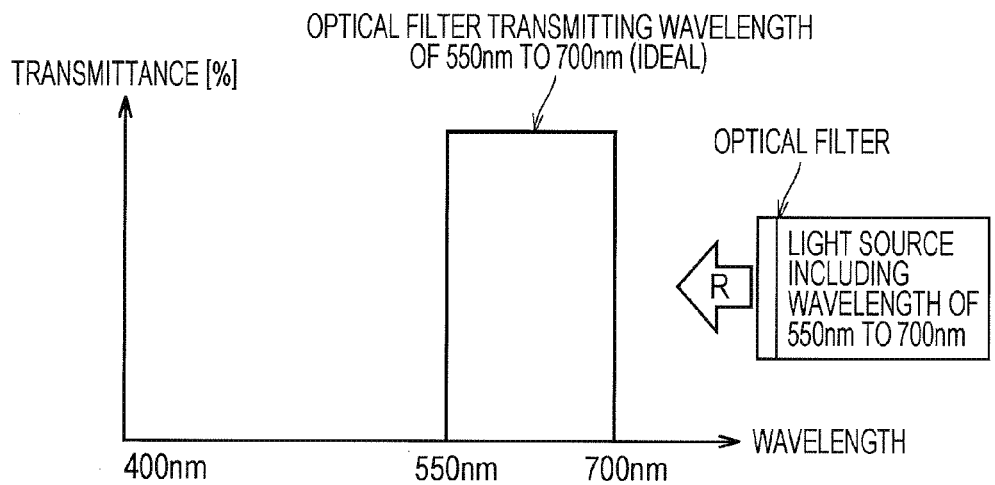
Figure 6C:
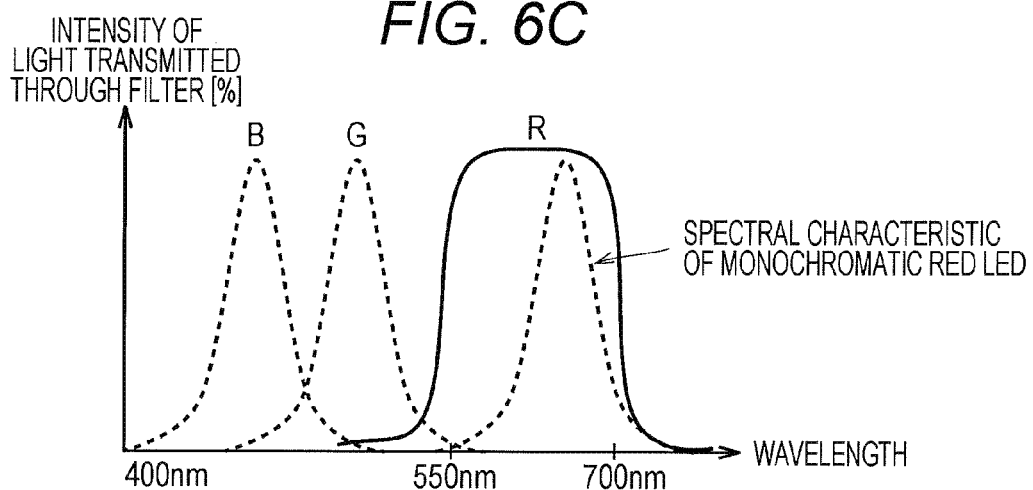

FIGS. 6A to 6C are graphs illustrating an overview of the image reading apparatus according to the present embodiment. With reference to FIG. 6A, the image reading apparatus according to the present embodiment uses, as an R light source, a light source having a sufficient intensity at least in a range from 550 nm to 700 nm, as an example. The sufficient intensity is, as an example, equal to or greater than half the maximum intensity of light of one of the other light sources, i.e., a G light source and a B light source. The details of the light source will be described later.

There may be a case where the light source is a white light source or the like that has the sufficient intensity in a wider wavelength range than 550 nm to 700 nm. In such a case, as illustrated in FIG. 6B, an optical filter that transmits light of 550 nm to 700 nm is mounted on the light source, thereby limiting a wavelength band of the light to be emitted to an object (document) to be read.

In this way, as illustrated in FIG. 6C, the light source of the image reading apparatus according to the present embodiment is able to achieve the sufficient intensity even in the vicinity of 570 nm, where the intensity is insufficient when the monochromatic red LED is used as the R light source. With the configuration above, the image reading apparatus according to the present embodiment is able to achieve high color reproducibility with a simple configuration.

In another aspect, the image reading apparatus according to the present embodiment may use, as a G light source, a light source having a sufficient intensity over a wider wavelength range than a monochromatic green LED, at least in a range from 500 nm to 580 nm.

Figure 7A:
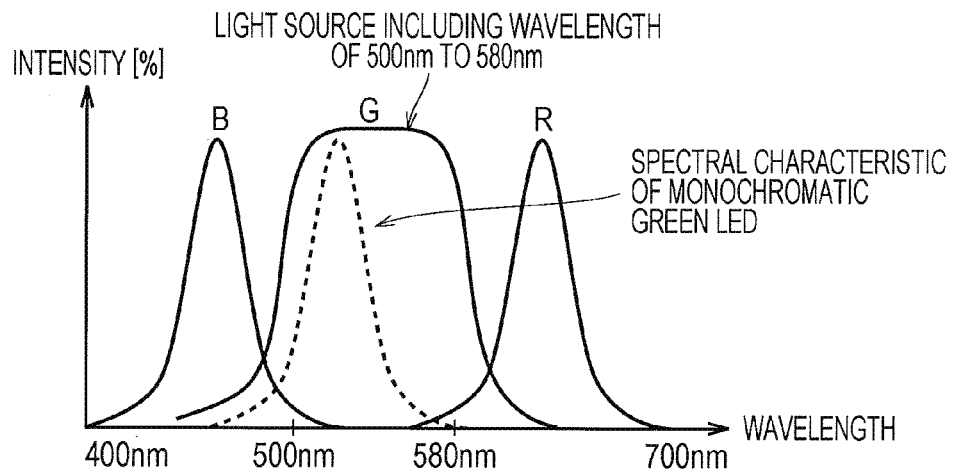
FIGS. 7A to 7C are graphs illustrating an overview (green) of the image reading apparatus according to the embodiment.
Figure 7B:
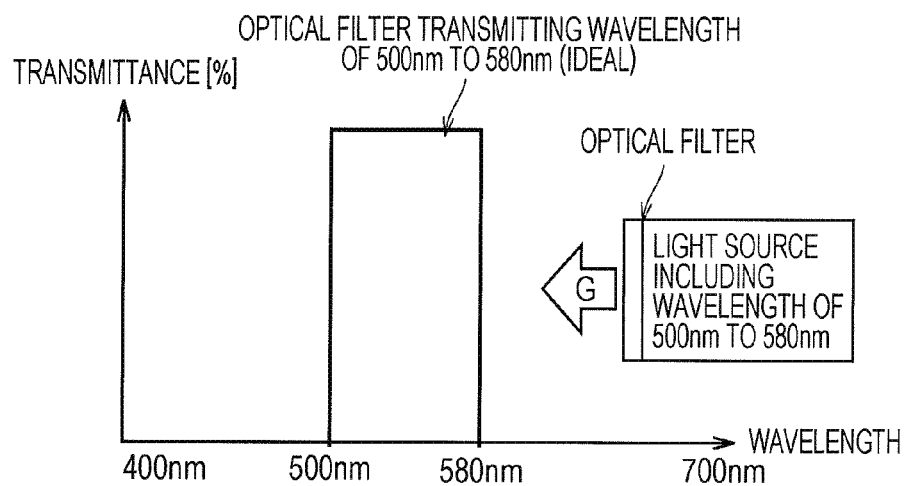
Figure 7C:
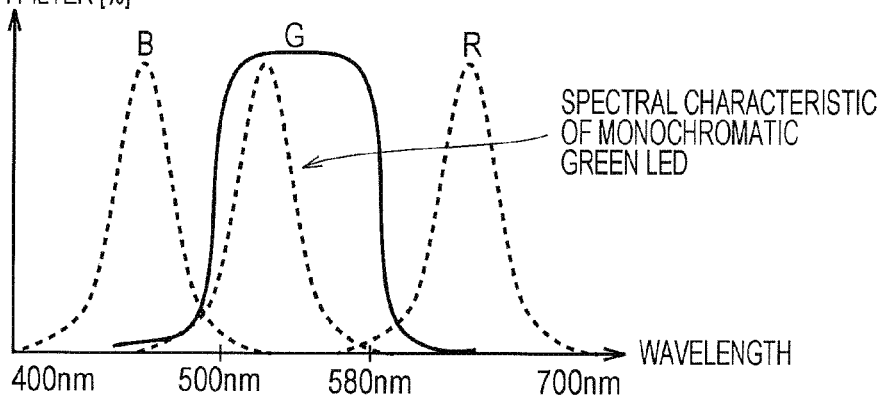

In this case, as illustrated in FIGS. 7A to 7C, the image reading apparatus according to the present embodiment is also able to achieve the sufficient intensity even in the vicinity of 570 nm, where the intensity is insufficient when the monochromatic green LED is used as the G light source. Therefore, with the configuration above, the image reading apparatus according to the present embodiment is also able to achieve high color reproducibility with a simple configuration.

In still another aspect, the image reading apparatus according to the present embodiment may also achieve the sufficient intensity even in the vicinity of 570 nm by using the R and G light sources, the intensities of which are sufficient in a wider wavelength range than the monochromatic red and green LEDs, respectively. In this case, it is preferred that the wavelength range in which the R light source has the sufficient intensity does not overlap the wavelength range in which the G light source has the sufficient intensity. For example, a light source having the sufficient intensity at least in a range from 560 nm to 700 nm and a light source having the sufficient intensity at least in a range from 500 nm to 560 nm can be used as the R light source and the G light source, respectively. With the configuration above, the image reading apparatus according to the present embodiment is also able to achieve high color reproducibility with a simple configuration. The following describes a configuration and control for realizing the image reading apparatus described above.

[C. First Embodiment—any One of R, G, and B Light Sources is White Light Source]

(c1. Image Forming Apparatus 1)

Figure 8:
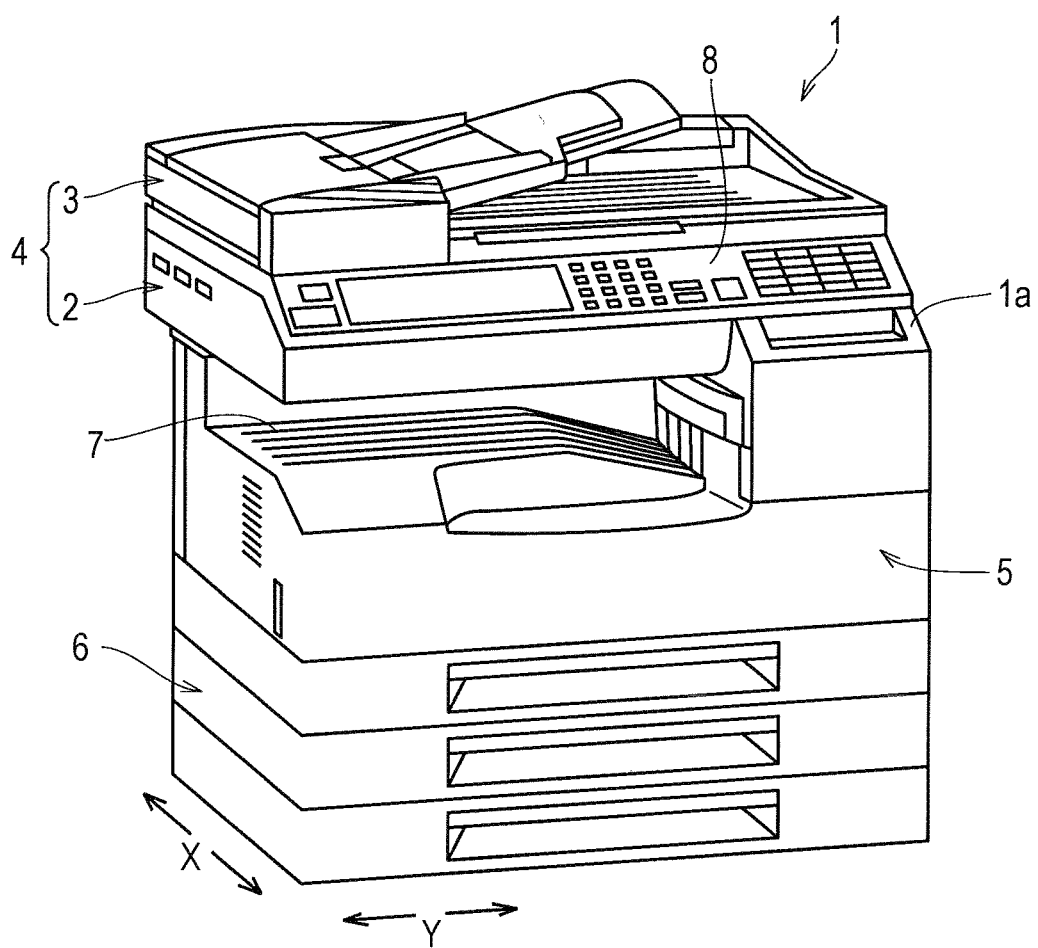
FIG. 8 is a view illustrating an exemplary external structure of an image forming apparatus according to a first embodiment.

FIG. 8 is a view illustrating an exemplary external structure of an image forming apparatus 1 according to the present embodiment. The image forming apparatus 1 illustrated in FIG. 8 includes many functions such as a copying function, a scanner function, a printer function, and a facsimile function, and is capable of sending and receiving data through a network (communication network) such as a LAN and a telephone line. Specifically, the image forming apparatus 1 can output image data read from a document to another computer through a network, or input image data from another computer through a network and execute printing based on the image data. Furthermore, the image forming apparatus 1 can send and receive FAX data.

An image input apparatus 4 is disposed in an upper portion of an apparatus main body 1a of the image forming apparatus 1, and includes a scanner 2 and an automatic document feeder 3 (hereinafter referred to as ADF 3). The image input apparatus 4 causes the scanner 2 and the ADF 3 to be operated in synchronization with each other, so as to optically read an image from each document set in the ADF 3, and obtains image data therefrom. Specifically, the ADF 3 conveys the documents to the scanner 2 one by one. While each document passes over a predetermined reading position, the scanner 2 reads an image and obtains the image data therefrom. The "document" herein refers to a document that includes an image and/or an object formed in a medium and having a reflection characteristic in a visible range. Furthermore, the document includes not only a handwritten text and/or drawing, but also a machine-printed text and/or image.

A sheet feeding unit 6 is disposed in a lower portion of the apparatus main body 1a, and accommodates recording materials. An image forming unit 5 is disposed between the image input apparatus 4 and the sheet feeding unit 6 in the apparatus main body 1a, and prints toner images on the recording materials. The sheet feeding unit 6 supplies the recording materials one by one to the image forming unit 5. The image forming unit 5 then prints a toner image onto the recording material on the basis of image data obtained by the image input apparatus 4 or through a network. A concaved space between the image input apparatus 4 and the image forming unit 5 in the apparatus main body 1a serves as a discharged sheet storing section 7. The recording material with the toner image printed by the image forming unit 5 is discharged to the discharged sheet storing section 7.

An operation unit 8, which includes a plurality of keys (buttons), is disposed in the apparatus main body 1a. A user operates the keys while viewing a display screen or the like on the operation unit 8 so as to set and operate a function selected from various functions of the image forming apparatus 1 or instruct the image forming apparatus 1 to execute operations.

(c2. Configuration of Image Input Apparatus)

Figure 9:
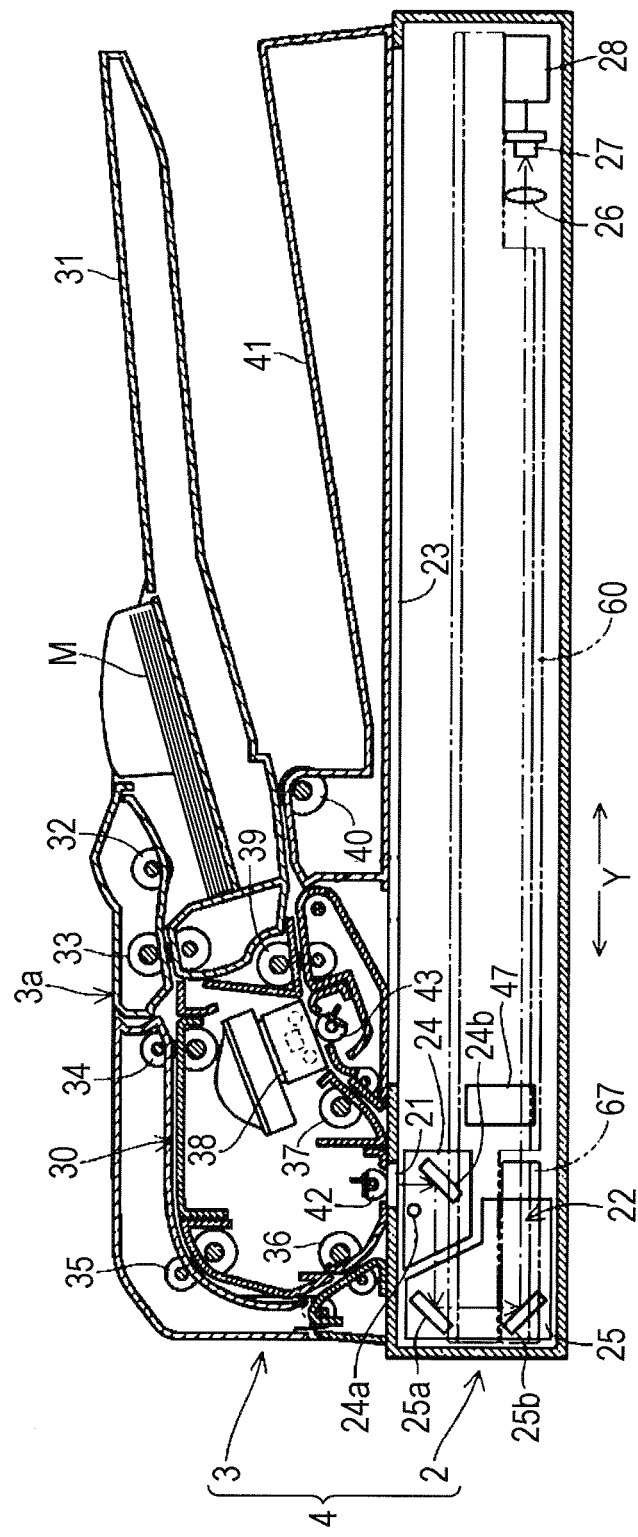
FIG. 9 is a view illustrating an exemplary configuration of an image input apparatus according to the first embodiment.

Next, a structure of the image input apparatus 4 is described mainly with reference to FIG. 9. The ADF 3 includes a sheet feeding tray 31 on which a plurality of documents M is loaded (set). The documents M loaded on the sheet feeding tray 31 are fed one by one from the uppermost portion to a document conveyance path 30 by a pickup roller 32 and a sheet feeding roller pair 33. Then, the document M is conveyed to a registration roller pair 35 through an intermediate roller pair 34. The registration roller pair 35 corrects the conveyed single sheet of document M to be in a predetermined attitude and conveys the document M toward a first conveyance roller pair 36 at a predetermined timing. Then, the document M is conveyed over a slit glass 21 of the scanner 2 by the first conveyance roller pair 36. The slit glass 21 is transparent, and formed in a substantially narrow-width long plate shape which extends in the main scanning direction (X direction illustrated in FIG. 8) perpendicular to the document conveyance direction.

When the document M passes over the slit glass 21, a first image reading apparatus 22 that rests below the slit glass 21 reads an image on a surface (front side) of the document M facing the first image reading apparatus 22. A second conveyance roller pair 37, a second image reading apparatus 38, a third conveyance roller pair 39, and a sheet discharge roller 40 are arranged in the conveyance downstream side of the slit glass 21 along the document conveyance path 30. The document M which has passed over the slit glass 21 is conveyed to a position just under the second image reading apparatus 38 by the second conveyance roller pair 37. Then, the second image reading apparatus 38 reads an image on a surface (back side) of the document M facing the second image reading apparatus 38 while the document M is being conveyed thereunder. The document M which has passed just under the second image reading apparatus 38 is discharged onto a sheet discharge tray 41 by the third conveyance roller pair 39 and the sheet discharge roller 40.

As is obvious from FIG. 9, the document conveyance path 30 in the ADF 3 is a path from the sheet feeding tray 31 to the sheet discharge tray 41 through the pickup roller 32, the sheet feeding roller pair 33, the intermediate roller pair 34, the registration roller pair 35, the first conveyance roller pair 36, the position above the slit glass 21, the second conveyance roller pair 37, the position just under the second image reading apparatus 38, the third conveyance roller pair 39, and the sheet discharge roller 40. In a side view, the document conveyance path 30 is a substantially U-shaped (curved) path.

A cleaning roller 42, which is rotatable, is provided above the slit glass 21. The cleaning roller 42 rotationally drives so as to remove foreign substances such as paper dust adhered to the slit glass 21 in a state where no document M is on the slit glass 21. A rotation roller 43 is rotatably disposed at a side opposite to the second image reading apparatus 38 with the document conveyance path 30 interposed therebetween. The rotation roller 43 is an example of a white reference member for shading correction.

The above-described slit glass 21 and a platen glass 23 are disposed on an upper surface of the scanner 2. The platen glass 23 is transparent and formed in a substantially wide flat plate shape. The first image reading apparatus 22 is disposed inside the scanner 2. The first image reading apparatus 22 includes a scanning unit 24, a driving unit 25, an image forming lens 26, and a line sensor 27. The scanning unit 24 includes a light source 24a and a reflection mirror 24b. The driving unit 25 includes a pair of inverting mirrors 25a and 25b. The first image reading apparatus 22 configured as above reads an image of the front side of the document M passing over the slit glass 21 and an image of the document M loaded on the platen glass 23.

More specifically, when the document M passes over the slit glass 21, the light source 24a irradiates the front side of the document M with light in a state where the scanning unit 24 and the driving unit 25 are fixed. The light reflected from the front side of the document M is guided to the line sensor 27 through the reflection mirror 24b, the pair of inverting mirrors 25a and 25b, and the image forming lens 26, thereby forming an image. The line sensor 27 converts the formed optical image into electric signals and outputs the electric signals to an image generation unit 28.

The scanning unit 24 and the driving unit 25 are engaged with a pair of support rails 60 disposed inside the scanner 2, and are slidingly moved by the power of an actuator which is not illustrated. Furthermore, a position detection sensor 47 is arranged between the slit glass 21 and the platen glass 23, and detects whether the driving unit 25 has passed.

The second image reading apparatus 38 is arranged inside the ADF 3, and reads an image of the back side of the document M passing over the rotation roller 43. The configuration of the second image reading apparatus 38 will be described below. In another aspect, the second image reading apparatus 38 maybe arranged in the scanner 2 and read the front side of the document M instead of the first image reading apparatus 22. In still another aspect, the second image reading apparatus 38 may be arranged in the scanner 2 in addition to the first image reading apparatus 22. In such a case, a configuration includes the two second image reading apparatuses 38 that read the front and back sides of the document M when reading both sides at a time.

(c3. Configuration of Image Reading Apparatus 38)

Figure 10:
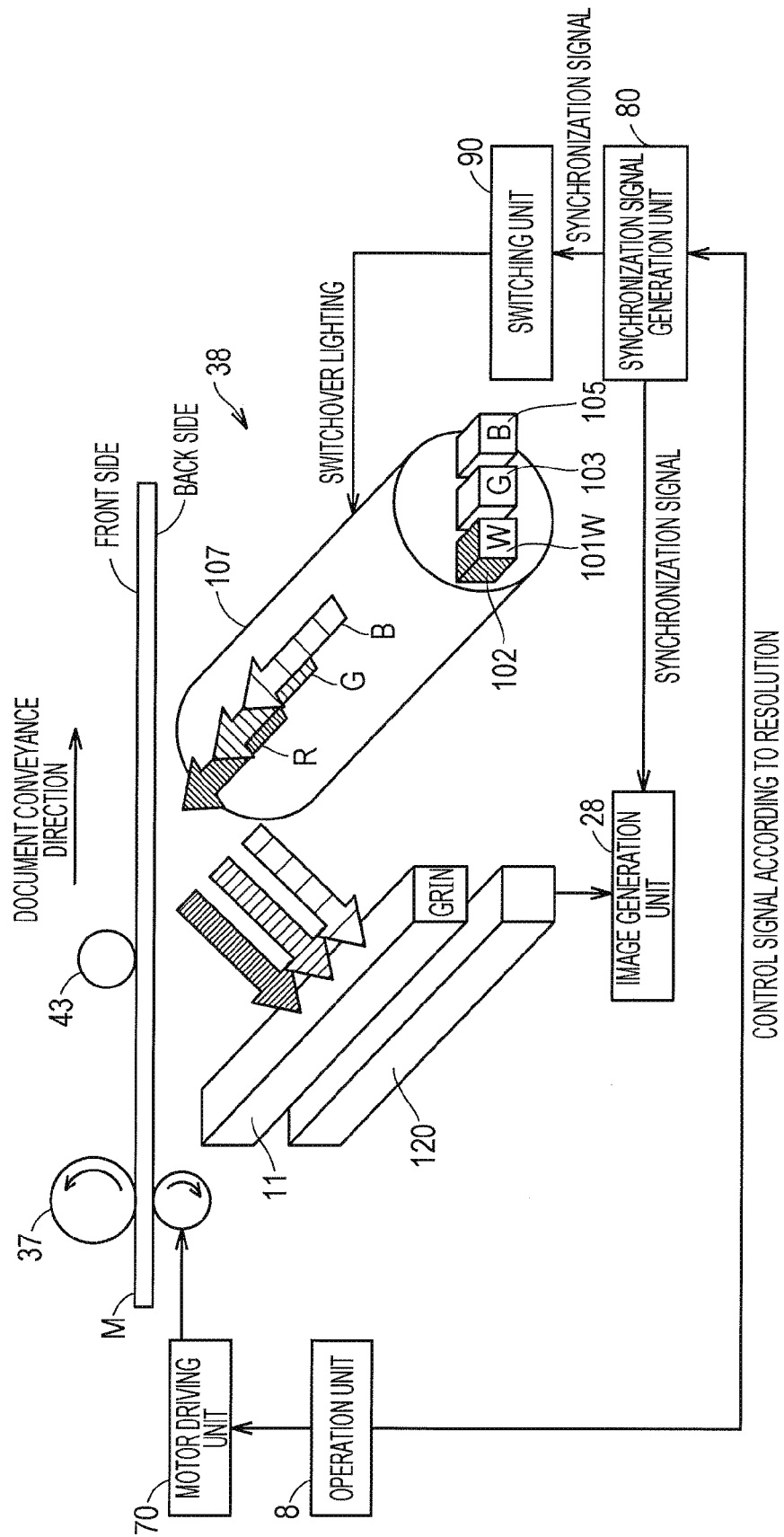
FIG. 10 is a diagram illustrating an operation overview of an image reading apparatus according to the first embodiment.

FIG. 10 is a diagram illustrating an operation overview of the image reading apparatus 38 according to the present embodiment. A user sets a reading resolution using the operation unit 8 and then instructs reading. In response, a motor driving unit 70 rotates the second conveyance roller pair 37 such that the document M is conveyed at a speed according to the resolution that has been set.

Furthermore, the operation unit 8 outputs, to a synchronization signal generation unit 80, a control signal according to the set resolution. When the synchronization signal generation unit 80 receives the control signal, the synchronization signal generation unit 80 generates a synchronization (clock) signal according to the resolution, and outputs the synchronization signal to the image generation unit 28 and a switching unit 90.

When the document M passes over the rotation roller 43, the switching unit 90 causes an R light source 101W, a G light source 103, and a B light source 105 to be illuminated consecutively in a predetermined order in synchronization with the synchronization signal input by the synchronization signal generation unit 80.

The R light source 101W is a white light source, and includes an LED, as an example. The "white light source" is defined as a light source having a wider wavelength component than a wavelength component that light of a monochromatic LED has. The R light source 101W may generate a white color by using a monochromatic blue LED and a yellow phosphor, or by mixing each light of monochromatic R, G, and B LEDs.

An optical filter 102 is mounted on the R light source 101W. Preferably, the optical filter 102 is mounted on the R light source 101W without a gap. In this way, it is possible to reduce light leaking from such a gap between the R light source 101W and the optical filter 102. Furthermore, since no separate filter needs to be disposed, this configuration can achieve space saving. As an example, the optical filter 102 is mounted on the R light source 101W by vapor deposition or the like.

The wavelength band of the light emitted from the R light source 101W is limited by the optical filter 102, through which the light turns into the one including a wavelength component corresponding to red. The details of the optical filter 102 will be described later. The G light source 103 serves as a light source that generates light including a wavelength component corresponding to green, while the B light source 105 serves as a light source that generates light including a wavelength component corresponding to blue. As an example, the G light source 103 and the B light source 105 are monochromatic green and blue LEDs, respectively.

The light emitted from these light sources is guided to the back side of the document M by a light guide 107. A light receiving surface of a line sensor 120 forms an image through a GRIN lens 110 with the light reflected from the back side of the document M.

The line sensor 120 commonly detects each light emitted from the R light source 101W, the G light source 103, and the B light source 105. The line sensor 120 includes a CIS in which a plurality of photoelectric conversion elements is arranged along the main scanning direction. Similar to the line sensor 27, the line sensor 120 also converts the formed optical image into electric signals and outputs the electric signals to the image generation unit 28. The image generation unit 28 generates digitalized image data by subjecting the electric signals input by the line sensor 120 to analog processing, A/D conversion, shading correction, image compression processing, and the like. The image generation unit 28 then outputs the digitalized image data to the image forming unit 5.

In another aspect, an incandescent bulb, a halogen lamp, a fluorescent lamp or the like may be used as the R light source 101W serving as a white light source, instead of an LED. However, the responsiveness of these white light sources is lower than that of the LED. In a case where one of these types of white light sources is illuminated while the other G light source 103 and B light source 105 are illuminated, the line sensor 120 is unable to accurately read the wavelength components corresponding to the green and blue of the image of the document M. Therefore, in a case where one of these types of white light source is employed, it is preferred that a shutter is provided. The shutter serves to shield the light of the white light source while the G light source 103 and the B light source 105 are illuminated. In this case, the opening and closing of the shutter is controlled in synchronization with the synchronization signal that the synchronization signal generation unit 80 outputs.

(c4. Image Generation Unit 28)

The following describes processing of the image generation unit 28 generating image data formed on the back side of the document M using the electric signals input by the line sensor 120 with reference to FIG. 11.

The line sensor 120 sequentially outputs the read electric signals to the image generation unit 28 in order of R, G, and B. When the synchronization signal is input by the synchronization signal generation unit 80 three times, the image generation unit 28 determines that the R, G, and B electric signals (image information) for one pixel line have been input by the line sensor 120, and then generates image data for the one pixel line. That is, the image generation unit 28 generates an image read from the document M, reflecting a spectral characteristic of the irradiation light corresponding to a detection result in the line sensor 120.

When each R, G, and B image data is represented by eight bits, white is [255, 255, 255] and black is [0, 0, 0]. The document information illustrated in FIG. 11 represents one pixel in the sub-scanning direction.

First, the image generation unit 28, in synchronization with the synchronization signal input by the synchronization signal generation unit 80, reads image data R1=0 corresponding to red as image data for the first scanning line by causing the R light source 101W to be illuminated. Similarly, the image generation unit 28 reads image data G1=0 and B1=0 corresponding to green and blue, respectively, by causing the G light source 103 and the B light source 105 to be illuminated consecutively. Similar to the first scanning line, the image generation unit 28 then reads image data R2=255, G2=255, and B2=255 for the second scanning line. In this way, the image generation unit 28 generates, as image data, [0, 0, 0] for the first scanning line and [255, 255, 255] for the second scanning line.

In another aspect, the image generation unit 28 may combine the pieces of image data corresponding to R, G, and B after completing the reading of the document M, instead of generating image data for one pixel line each time the synchronization signal is input three times.

(c5. Characteristic of Light Source)

Figure 12A:
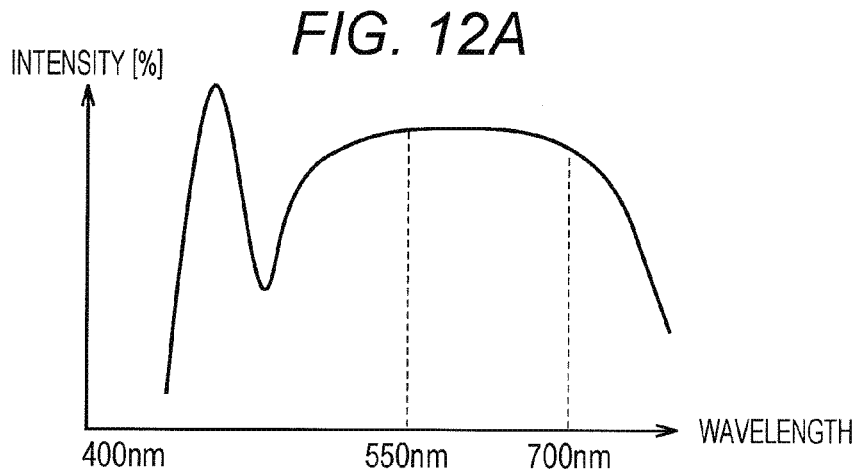
FIGS. 12A to 12C are graphs illustrating characteristics of a light source and an optical filter according to the first embodiment.

A white light source is used for the R light source 101W serving as a light source of the image reading apparatus 38. As illustrated in FIG. 12A, a spectral characteristic of the R light source 101W has an intensity equal to or greater than a predetermined value in a wavelength range including 550 nm to 700 nm. The predetermined value is, as an example, a half of the maximum intensity of the G light source 103 or the B light source 105. The intensity of the light of the R light source 101W is preferably constant in this wavelength range. In addition, the intensity of the light of the R light source 101W is preferably close to 0% in a wavelength range exceeding 700 nm.

Figure 12B:
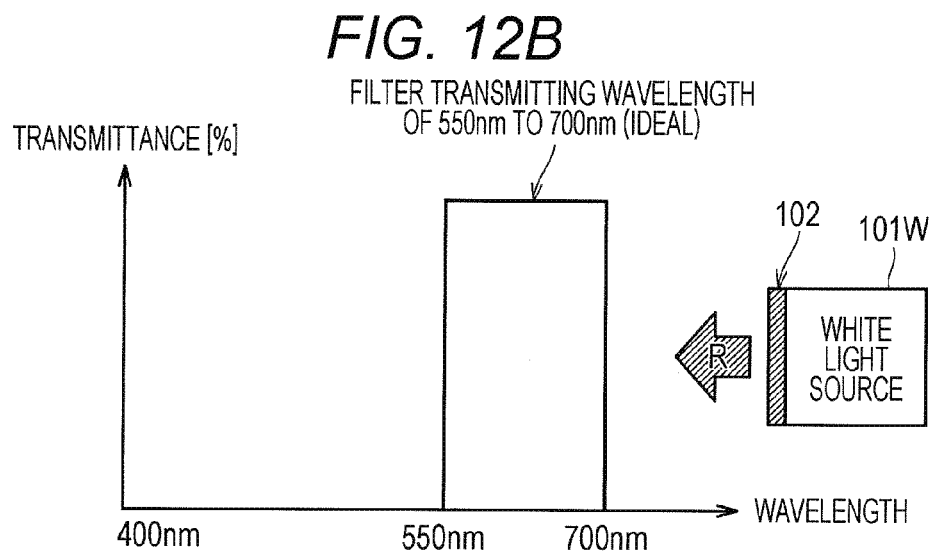

FIG. 12B is a graph illustrating an example of a transmission characteristic of the optical filter 102. As illustrated in FIG. 12B, the optical filter 102 is, as an example, configured to transmit light of at least 550 nm to 700 nm. As an example, the "wavelength to be transmitted" through the optical filter 102 is defined as a wavelength at which the intensity after transmission is equal to or greater than 50% of the intensity before transmission. The optical filter 102 includes, as an example, a color filter, a bandpass filter, a dichroic filter, a longpass filter, or the like.

The following describes the wavelength range from 550 nm to 700 nm that the optical filter 102 transmits. In the wavelength range where the monochromatic red LED emits light, the longer wavelength side is in the vicinity of 700 nm. In addition, in the wavelength range that the monochromatic green LED (G light source 103) emits light at the intensity equal to or greater than the predetermined value, the longer wavelength side is less than 550 nm. Therefore, the wavelength range that the optical filter 102 transmits is preferably set within the above range to improve the color reproducibility of the image reading apparatus 38.

The shorter wavelength side of the wavelength that the optical filter 102 transmits should at least exceed the longer wavelength side of a half-value width of a wavelength with respect to the maximum intensity of a spectral characteristic of the light from the G light source 103. For example, in a case where the wavelength corresponding to the maximum intensity of the G light source 103 is 520 nm and the full width at half maximum is 20 nm, the shorter wavelength side of the wavelength that the optical filter 102 transmits should at least exceed 530 nm.

With this configuration, the spectral characteristic of the light transmitted through the optical filter 102 does not excessively overlap the spectral characteristic of the light from the G light source 103. In a case where the spectral characteristic of the light from the R light source 101W excessively overlaps the spectral characteristic of the light from the G light source 103, the line sensor 120 reads not only image components of the document M corresponding to red, but also image components of the document M corresponding to green. In such a case, the color reproducibility of the image data generated by the image generation unit 28 deteriorates.

In other words, the optical filter 102 and the R light source 101W may be combined in any way as long as the following two points are satisfied. The first point is that the spectral characteristic of the light transmitted through the optical filter 102 should at least have an intensity equal to or greater than the predetermined value in a range from 550 nm to 700 nm. The second point is that the shorter wavelength side of the wavelength range having the intensity equal to or greater than the predetermined value should not at least overlap the longer wavelength side of the half-value width with respect to the maximum intensity of the G light source 103. Alternatively, the power to be supplied to the R light source 101W may be set such that the intensity of the light transmitted through the optical filter 102 becomes the predetermined value or greater in the above-described range.

Figure 12C:
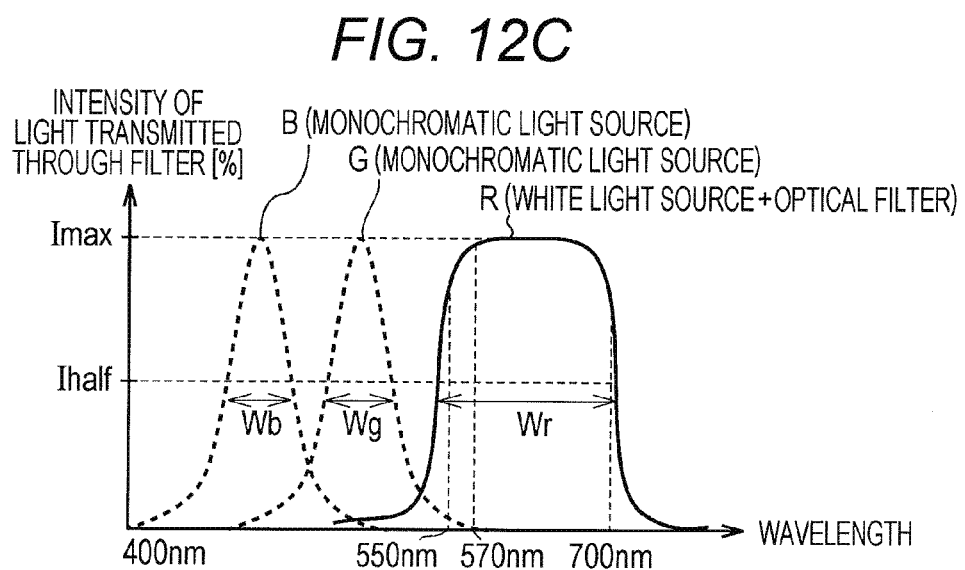

FIG. 12C is a graph illustrating the spectral characteristic of the light transmitted through the optical filter 102 as well as the spectral characteristic of each light of the G light source 103 and B light source 105. The spectral characteristic of the light transmitted through the optical filter 102 has the sufficient intensity equal to or greater than the predetermined value even in the vicinity of 570 nm, where the intensity is insufficient when the monochromatic LEDs are used as the R, G, and B light sources for each, as illustrated in FIG. 4.

As a result, the image reading apparatus 38 according to the present embodiment is able to achieve high color reproducibility compared to the case where the monochromatic LEDs are used as the R, G, and B light sources for each.

Furthermore, when switching over the R, G, and B light sources that irradiate the document M, the image reading apparatus 38 does not use a driving mechanism, but only needs to switch over the light sources for illumination. Such a simple configuration of the image reading apparatus 38 can therefore serve to reduce costs. Furthermore, since no driving mechanism is mounted on the image reading apparatus 38, the image reading apparatus 38 is able to suppress a reduction in accuracy of reading an object due to vibrations.

In another aspect, the wavelength range that the optical filter 102 transmits is not limited to 550 nm to 700 nm. The optical filter 102 should at least be configured such that a half-value width of a wavelength with respect to the maximum intensity of a spectral characteristic of light transmitted through the optical filter 102 is wider than a half-value width of a wavelength with respect to the maximum intensity of a spectral characteristic of light from a light source other than the white light source.

With reference to FIG. 12C, the maximum intensity of the spectral characteristic of the light transmitted through the optical filter 102 is assumed to be Imax in this example. Likewise, the maximum intensity of each of the spectral characteristics of light of the other light sources, i.e., the G light source 103 and the B light source 105, is also assumed to be Imax. In this case, the optical filter 102 should at least be configured such that a half-value width Wr of a wavelength with respect to the maximum intensity Imax of the spectral characteristic of the light transmitted through the optical filter 102 is wider than a half-value width Wg or Wb. The half-value width Wg is a half-value width of a wavelength with respect to the maximum intensity Imax of the spectral characteristic of the light from one of the other light sources, G light source 103. The half-value width Wb is a half-value width of a wavelength with respect to the maximum intensity Imax of the spectral characteristic of the light from another one of the other light sources, B light source 105. In this way, the image reading apparatus 38 is able to improve the color reproducibility compared to the case where the monochromatic LEDs are used as the R, G, and B light sources for each.

(c6. Modification)

In the example described above, the light source including the R light source 101W and the optical filter 102 is used as an R light source in order to reinforce the intensity of the light source in the vicinity of 570 nm.

Alternatively, an image reading apparatus 38A according to the present modification uses a G light source including a wider wavelength component than a monochromatic green LED instead of the R light source, so as to reinforce the intensity in the vicinity of 570 nm. It is to be noted that since the basic configuration of the image reading apparatus 38A according to the present modification is substantially the same as that of the image reading apparatus 38 described above, the difference will be described hereinafter.

Figure 13:
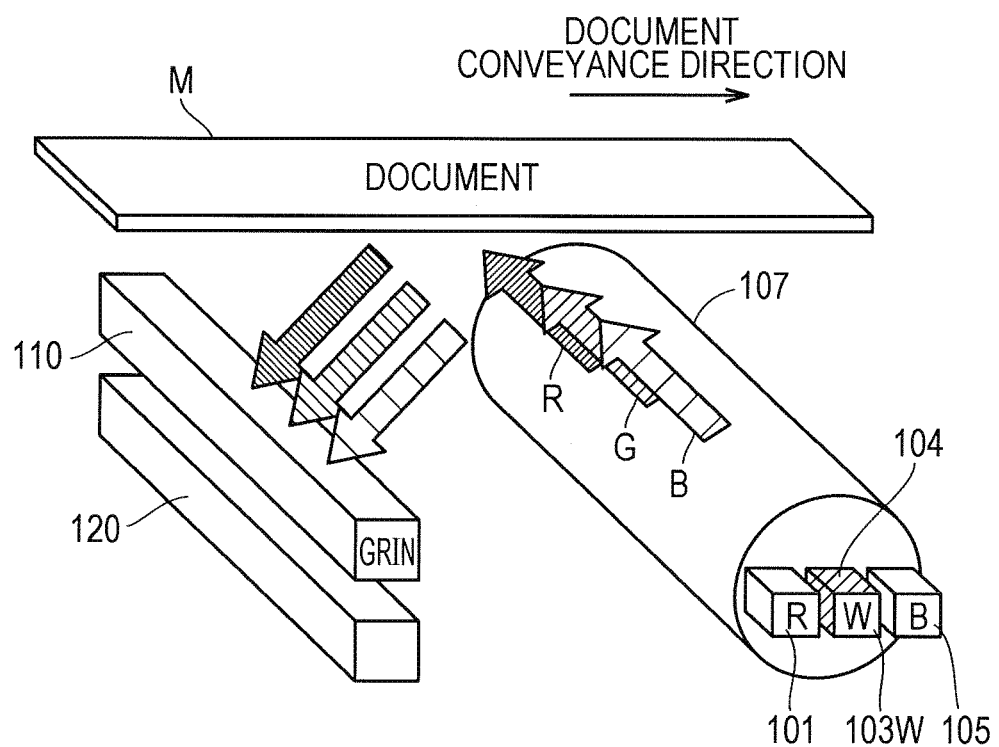
FIG. 13 is a diagram illustrating an exemplary configuration of an image reading apparatus according to a modification of the first embodiment.

FIG. 13 is a diagram illustrating an exemplary configuration of the image reading apparatus 38A according to the modification. With reference to FIG. 13, the image reading apparatus 38A includes, as light sources, an R light source 101 serving as a monochromatic red LED, a G light source 103W, and a B light source 105. The G light source 103W is a white light source, and includes an LED, as an example. An optical filter 104 is mounted on the G light source 103W. Similar to the example above, the optical filter 104 is preferably mounted on the G light source 103W without a gap.

Figure 14A:
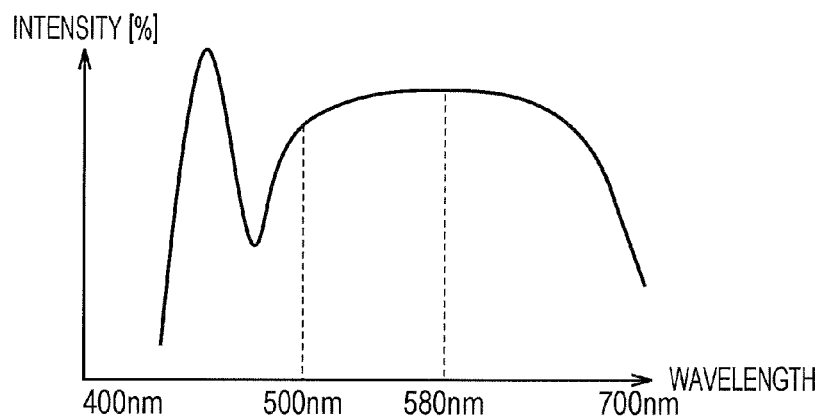
FIGS. 14A to 14C are graphs illustrating characteristics of a light source and an optical filter according to the modification of the first embodiment.

As illustrated in FIG. 14A, a spectral characteristic of light from the G light source 103W has an intensity equal to or greater than a predetermined value over a visible light range including 500 nm to 580 nm. The predetermined value is, as an example, a half of the maximum intensity of the R light source 101 or the B light source 105.

Figure 14B:
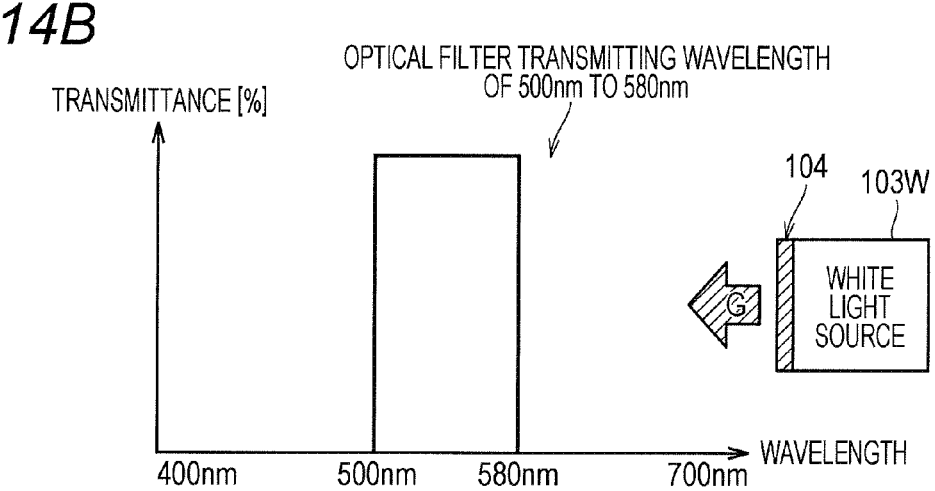

FIG. 14B is a graph illustrating an example of a transmission characteristic of the optical filter 104. As illustrated in FIG. 14B, the optical filter 104 is, as an example, configured to transmit light of at least 500 nm to 580 nm. As an example, the "wavelength to be transmitted" through the optical filter 104 is defined as a wavelength at which the intensity after transmission is equal to or greater than 50% of the intensity before transmission.

The following describes the wavelength range from 500 nm to 580 nm that the optical filter 104 transmits. In the wavelength range where the monochromatic green LED emits light, the shorter wavelength side is in the vicinity of 500 nm. In addition, in the wavelength range that the monochromatic red LED (R light source 101) emits light at an intensity equal to or greater than the predetermined value, the shorter wavelength side exceeds 580 nm. Therefore, the wavelength range that the optical filter 104 transmits is preferably set within the above range to improve the color reproducibility of the image reading apparatus 38A.

The longer wavelength side of the wavelength that the optical filter 104 transmits should at least be configured such that the longer wavelength side thereof does not exceed the shorter wavelength side of a half-value width of a wavelength with respect to the maximum intensity of a spectral characteristic of light from the R light source 101.

The optical filter 104 and the G light source 103W may be combined in any way, as long as the spectral characteristic of the light transmitted through the optical filter 104 has an intensity equal to or greater than the predetermined value in the range from 500 nm to 580 nm and the longer wavelength side of the wavelength range having the intensity equal to or greater than the predetermined value does not overlap the shorter wavelength side of a half-value width with respect to the maximum intensity of the R light source 101.

Figure 14C:
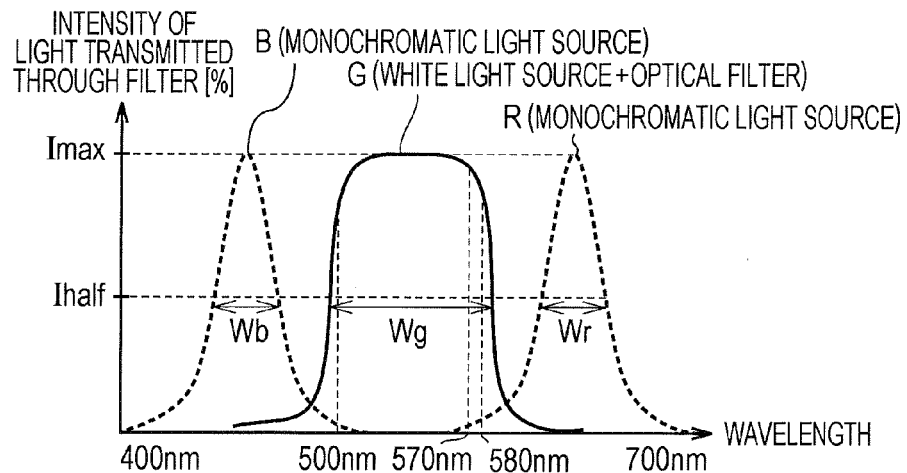

FIG. 14C is a graph illustrating the spectral characteristic of the light transmitted through the optical filter 104 as well as the spectral characteristic of each light from the R light source 101 and the B light source 105. The spectral characteristic of the light transmitted through the optical filter 104 has the sufficient intensity equal to or greater than the predetermined value even in the vicinity of 570 nm, where the intensity is insufficient when the monochromatic LEDs are used as the R, G, and B light sources for each, as illustrated in FIG. 4. As a result, the image reading apparatus 38A according to the present modification is able to achieve high color reproducibility compared to the case where the monochromatic LEDs are used as the R, G, and B light sources for each.

In another aspect, the wavelength range that the optical filter 104 transmits is not limited to 500 nm to 580 nm. The optical filter 104 should at least be configured such that a half-value width of a wavelength with respect to the maximum intensity of a spectral characteristic of light transmitted through the optical filter 104 is wider than a half-value width of a wavelength with respect to the maximum intensity of a spectral characteristic of light from a light source other than the white light source. As a result, the image reading apparatus 38A is able to improve the color reproducibility compared to the case where the monochromatic LEDs are used as the R, G, and B light sources for each.

[D. Second Embodiment—Superimposing Light Source Including White Light Source and Optical Filter on R, G, and B Light Sources]

(d1. Monochromatic R Light Source and Light Source Including White Light Source and Optical Filter that Transmits Wavelength Corresponding to Red)

With the configuration described in the first embodiment, any one of the three R, G, and B light sources includes a white light source and an optical filter. However, depending on the combination of the white light source and the optical filter, there is a possibility that the intensity of light transmitted through the optical filter is low. Therefore, in the present embodiment, an image reading apparatus includes, as light sources, not only monochromatic R, G, and B LEDs but also a light source including a white light source and an optical filter, thereby suppressing the lack of intensity of a specific light source. It is to be noted that since the basic configuration of an image reading apparatus 38B according to the present embodiment is substantially the same as that of the image reading apparatus 38 described above, the difference will be described hereinafter.

Figure 15A:
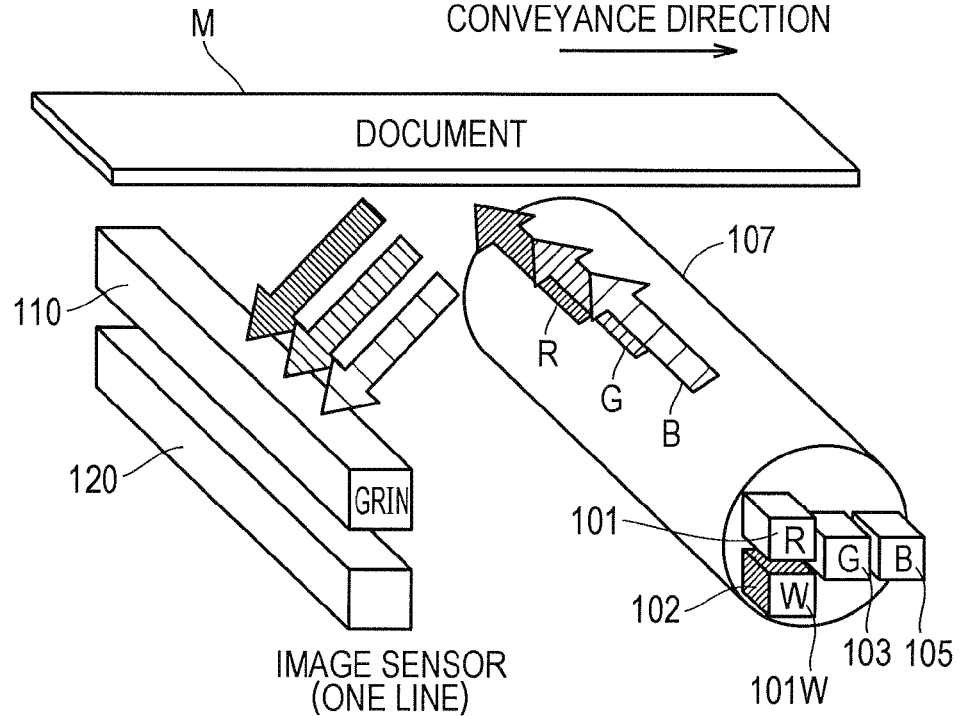
FIGS. 15A and 15B are diagrams illustrating an exemplary configuration of an image reading apparatus according to a second embodiment.
Figure 15B:
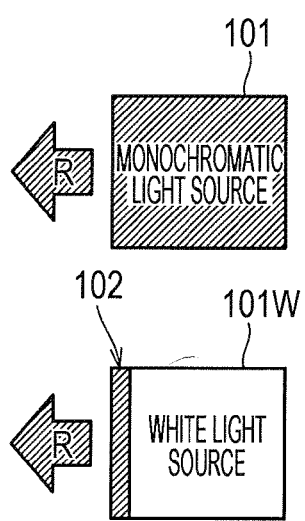

FIGS. 15A and 15B are diagrams illustrating an exemplary configuration of the image reading apparatus 38B according to the second embodiment. With reference to FIGS. 15A and 15B, the image reading apparatus 38B includes, as light sources, an R light source 101W as a white light source in addition to an R light source 101, a G light source 103, and a B light source 105 as monochromatic LEDs. The R light source 101 and the R light source 101W are disposed so as to be adjacent to each other. An optical filter 102 is mounted on the R light source 101W. With this configuration, the image reading apparatus 38B further includes the R light source 101 separately from the R light source 101W serving as the white light source. The R light source 101 has a spectral characteristic in which the wavelength at the maximum intensity is within the wavelength range that the optical filter 102 transmits.

Furthermore, the position of a light guide 107 irradiated by the light source including the R light source 101W and the optical filter 102 is aligned with the position of the light guide 107 irradiated by the R light source 101. In addition, the switching unit 90 illustrated in FIG. 10 causes not only the R light source 101W but also the R light source 101 to be illuminated.

Figure 16:
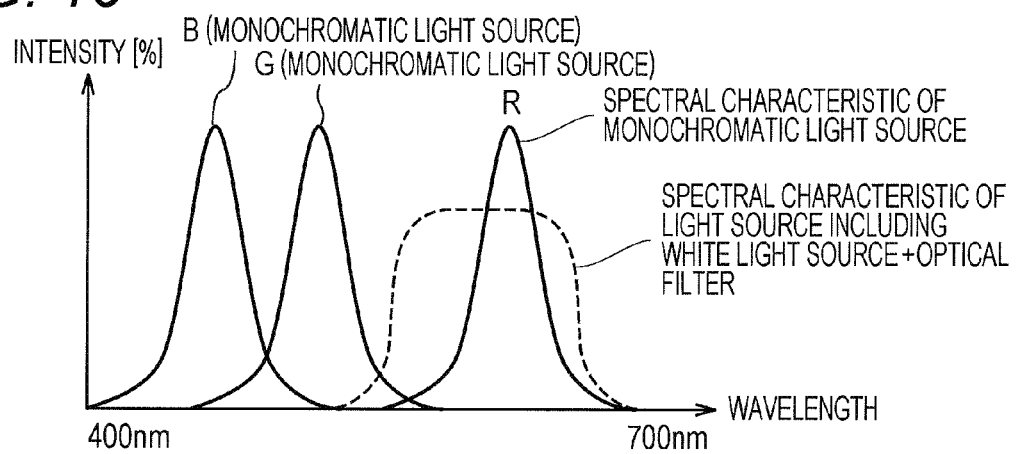
FIG. 16 is a graph illustrating a spectral characteristic of light transmitted through an optical filter as well as spectral characteristics of light from an R light source, a G light source, and a B light source according to the second embodiment.

FIG. 16 is a graph illustrating a spectral characteristic of the light transmitted through the optical filter 102 as well as a spectral characteristic of each light from the R light source 101, the G light source 103, and the B light source 105.

With reference to FIG. 16, the image reading apparatus 38B includes not only the light source including the R light source 101W and the optical filter 102 but also the R light source 101 which is the monochromatic red LED. Therefore, the image reading apparatus 38B is able to secure the light intensity of the monochromatic red LED with the presence of the R light source 101. Furthermore, the light source including the R light source 101W and the optical filter 102 includes a wide wavelength component at least including 550 nm to 700 nm, although the light is attenuated by the optical filter 102.

With the configuration above, the image reading apparatus 38B according to the present embodiment is able to suppress the lack of intensity of the R light source due to the optical filter 102. This can be achieved by further including the R light source 101 which is the monochromatic red LED. In this way, the image reading apparatus 38B surely achieves the sufficient intensity equal to or greater than the predetermined value even in the vicinity of 570 nm, where the intensity is insufficient when only the monochromatic LEDs are used as the R, G, and B light sources as illustrated in FIG. 4. Therefore, the image reading apparatus 38B is able to achieve high color reproducibility.

Furthermore, when switching over the R, G, and B light sources that irradiate the document M, the image reading apparatus 38B does not use a driving mechanism, but only needs to switch over the light sources for illumination. Such a simple configuration of the image reading apparatus 38B can therefore serve to reduce costs. Furthermore, since no driving mechanism is mounted on the image reading apparatus 38B, the image reading apparatus 38B is able to suppress a reduction in accuracy of reading an object due to vibrations.

(d2. First Modification—Adjusting Maximum Intensity)

Figure 17:
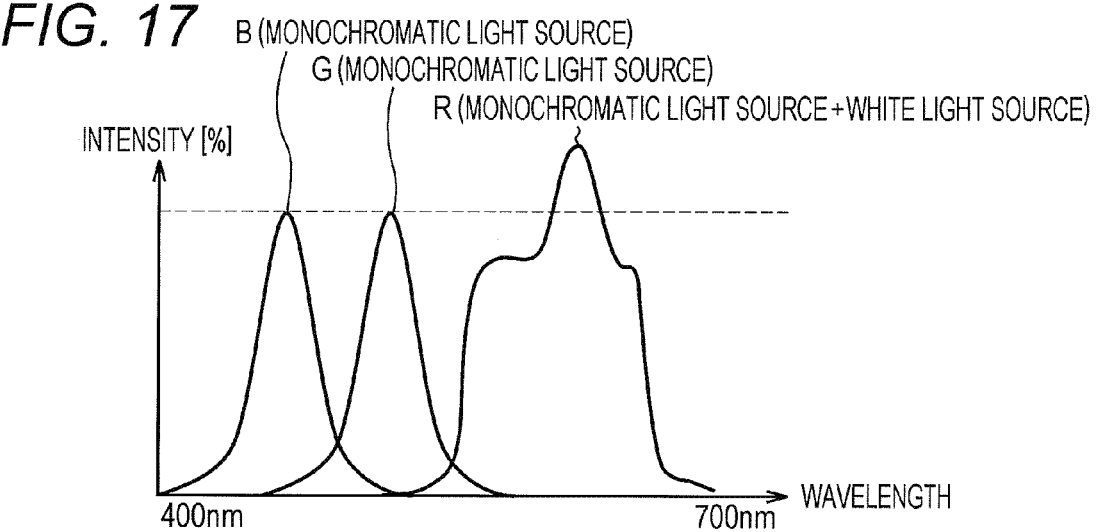
FIG. 17 is a graph illustrating the spectral characteristic of each light to be read by the image reading apparatus according to the second embodiment.

As illustrated in FIG. 17, there is a possibility that the maximum intensity of a spectral characteristic of light obtained by combining the light of the R light source 101W transmitted through the optical filter 102 and the light of the R light source 101 illustrated in FIG. 16 becomes greater than the maximum intensity of each light of the other light sources, i.e., the G light source 103 and the B light source 105.

For example, in a case where each power per unit time supplied to the R light source 101, the R light source 101W, the G light source 103, and the B light source 105 is the same, the balance among the R, G, and B light intensities is significantly lost, as illustrated in FIG. 17. In this case, since the color balance of the document M read by the image reading apparatus 38B is lost, processing for correcting the balance is necessary accordingly.

Figure 18:
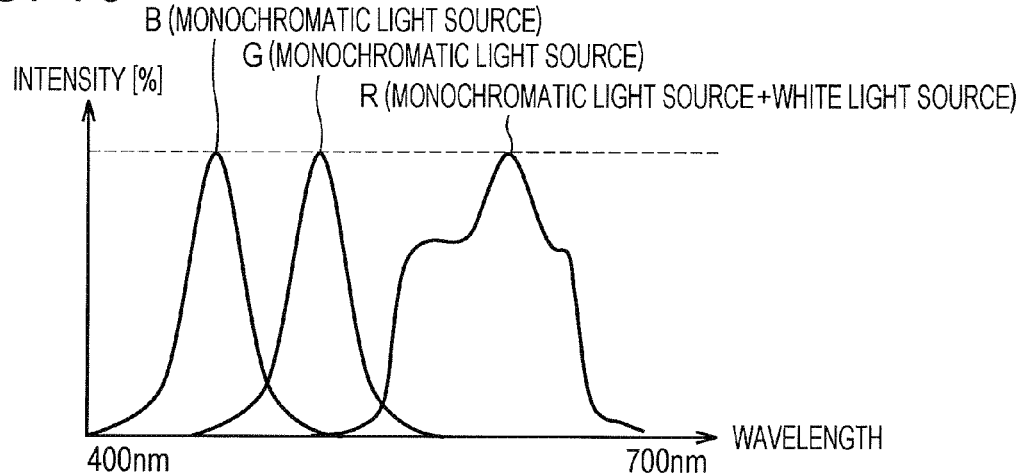
FIG. 18 is a graph illustrating a spectral characteristic of each light to be read by an image reading apparatus according to a modification of the second embodiment.

Therefore, as illustrated in FIG. 18, it is preferred that the maximum intensity of the spectral characteristic of the light obtained by combining the light of the R light source 101W transmitted through the optical filter 102 and the light of the R light source 101 is substantially equal to the maximum intensity of the spectral characteristic of each of the other light sources, i.e., the G light source 103 and the B light source 105. For example, the configuration above may be realized by controlling the power per unit time supplied to each light source or by adjusting the luminous efficiency of each light source as well as the transmittance of the optical filter.

By balancing the light intensities among R, G, and B as described above, not only does the color reproducibility of the image reading apparatus 38B improve, but also the image processing load in the image generation unit 28 can be reduced.

(d3. Second Modification—Monochromatic G Light Source and White Light Source+Optical Filter that Transmits Green)

The example described above includes not only the R light source 101 which is the monochromatic red LED, but also the light source including the R light source 101W, serving as the white light source, and the optical filter 102. In the present modification, a light source including a white light source and an optical filter that transmits a wavelength corresponding to green is used in addition to a G light source 103 which is a monochromatic green LED. It is to be noted that since the basic configuration of an image reading apparatus 38C according to the present modification is substantially the same as that of the image reading apparatus 38 described above, the difference will be described hereinafter.

Figure 19A:
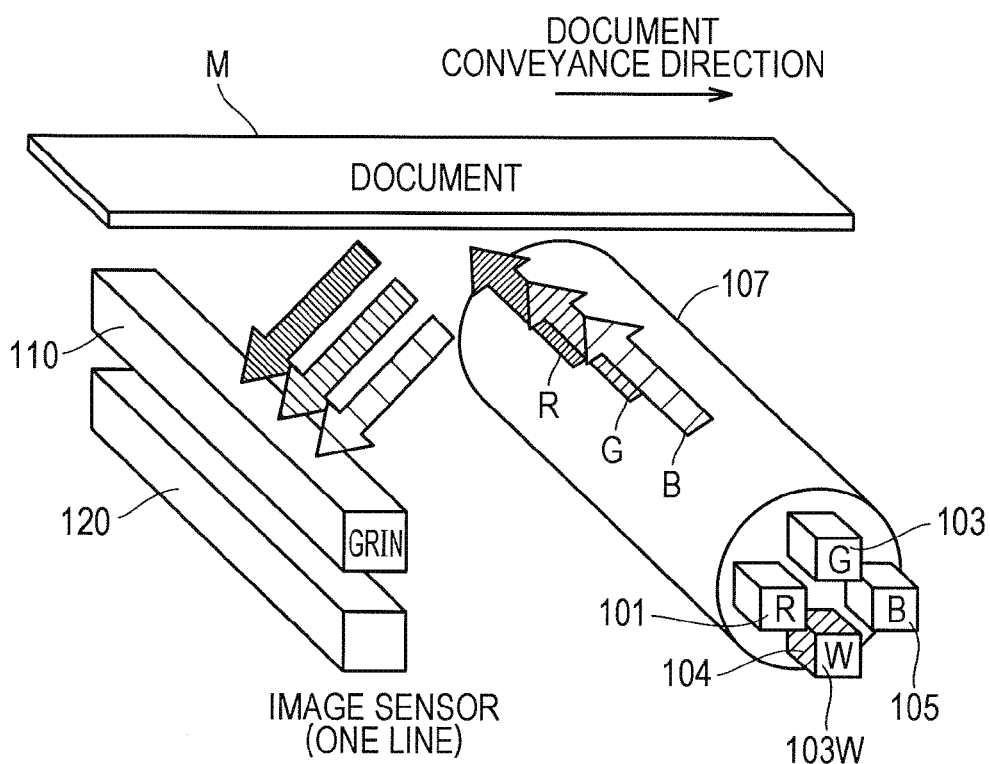
FIGS. 19A and 19B are diagrams illustrating an exemplary configuration of an image reading apparatus according to another modification of the second embodiment.
Figure 19B:
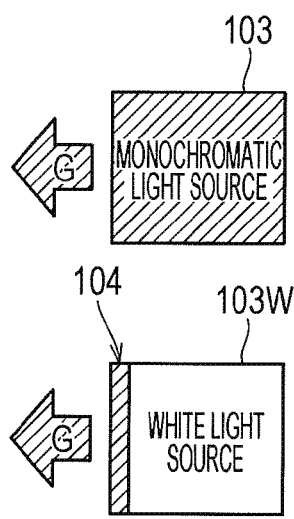

FIGS. 19A and 19B are diagrams illustrating an exemplary configuration of the image reading apparatus 38C according to the second modification. With reference to FIGS. 19A and 19B, the image reading apparatus 38C includes, as light sources, a G light source 103W as a white light source in addition to an R light source 101, the G light source 103, and a B light source 105 as monochromatic LEDs. An optical filter 104 is mounted on the G light source 103W. In other words, the image reading apparatus 38C further includes the G light source 103 separately from the G light source 103W serving as the white light source. The G light source 103 emits light having a spectral characteristic in which the wavelength at the maximum intensity is within the wavelength range that the optical filter 104 transmits.

Furthermore, the position of a light guide 107 irradiated by the light source including the G light source 103W and the optical filter 104 is aligned with the position of the light guide 107 irradiated by the G light source 103. In addition, the switching unit 90 illustrated in FIG. 10 causes not only the G light source 103W but also the G light source 103 to be illuminated.

Figure 20:
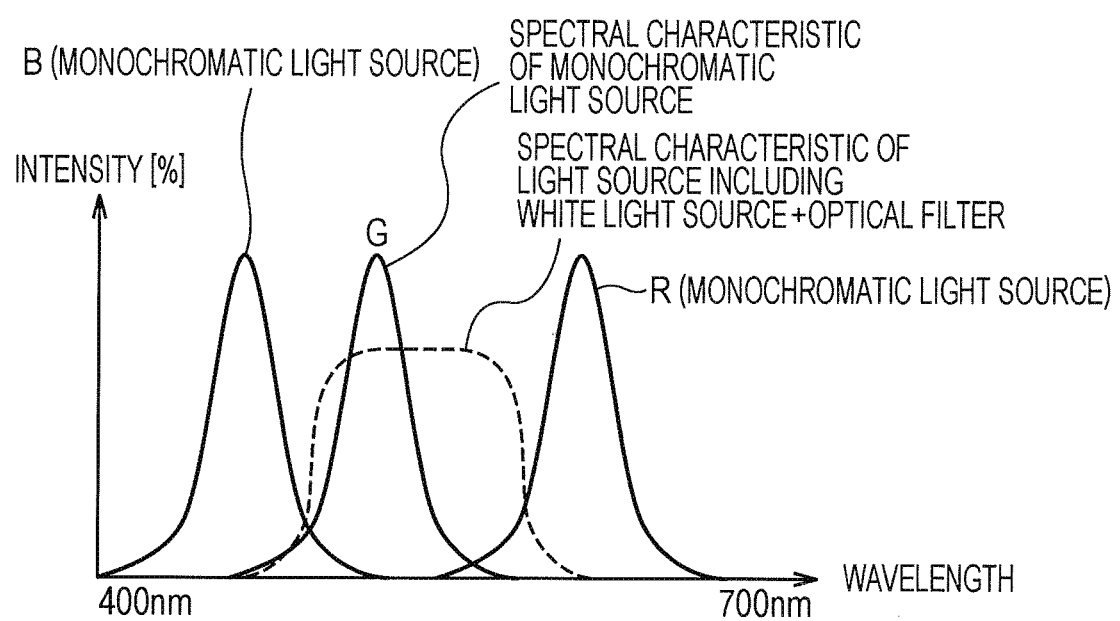
FIG. 20 is a graph illustrating a spectral characteristic of light transmitted through an optical filter as well as a spectral characteristic of each light from an R light source, a G light source, and a B light source according to the other modification of the second embodiment.

FIG. 20 is a graph illustrating a spectral characteristic of the light of the G light source 103W transmitted through the optical filter 104 as well as a spectral characteristic of each light from the R light source 101, the G light source 103, and the B light source 105.

With reference to FIG. 20, the image reading apparatus 38C includes not only the G light source 103 which is the monochromatic green LED, but also the light source including the G light source 103W and the optical filter 104. Therefore, the image reading apparatus 38C is able to secure the light intensity of the monochromatic green LED with the presence of the G light source 103. Furthermore, the light source including the G light source 103W and the optical filter 104 includes a wide wavelength component at least including 500 nm to 580 nm, although the light is attenuated by the optical filter 104.

With the configuration above, the image reading apparatus 38C according to the present modification is able to suppress the lack of intensity of the G light source due to the optical filter 104 by further including the G light source 103 which is the monochromatic green LED. In this way, the image reading apparatus 38C surely achieves the sufficient intensity equal to or greater than the predetermined value even in the vicinity of 570 nm, where the intensity is insufficient when only the monochromatic LEDs are used as the R, G, and B light sources as illustrated in FIG. 4. Therefore, the image reading apparatus 38C is able to achieve high color reproducibility.

Furthermore, when switching over the R, G, and B light sources that irradiate the document M, the image reading apparatus 38C does not use a driving mechanism, but only needs to switch over the light sources for illumination. Such a simple configuration of the image reading apparatus 38C can therefore serve to reduce costs. Furthermore, since no driving mechanism is mounted on the image reading apparatus 38C, the image reading apparatus 38C is able to suppress a reduction in accuracy of reading an object due to vibrations.

Similar to the above first modification (second embodiment), the image reading apparatus 38C according to the present modification is also preferably configured such that the light intensities are balanced among the R, G, and B light sources.

[E. Third Embodiment—Method of Mounting Optical Filter]

Figure 21:
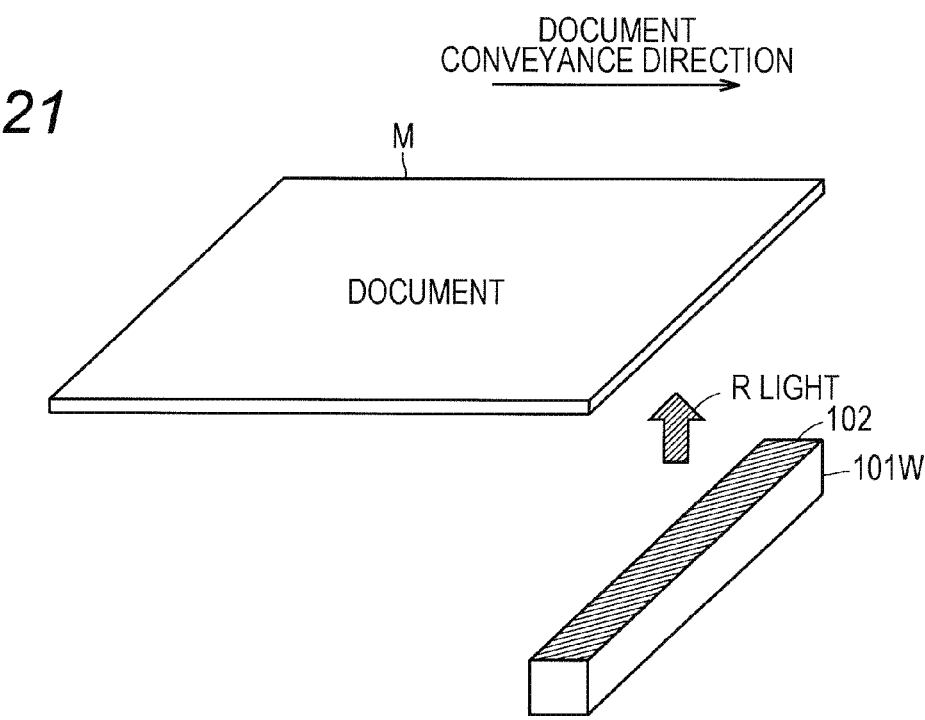
FIG. 21 is a diagram illustrating an exemplary configuration of an optical filter.
Figure 22:
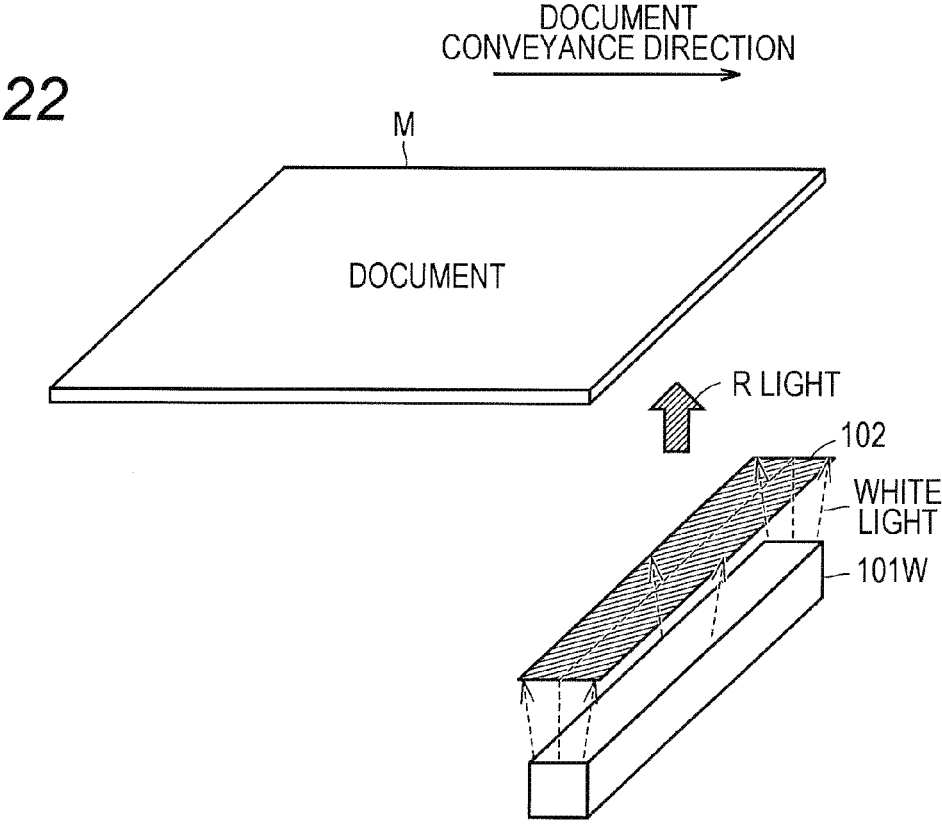
FIG. 22 is a diagram illustrating an exemplary configuration of the optical filter according to a modification.

In the embodiments above, the optical filter 102 is mounted on the surface of the R light source 101W serving as the white light source, as illustrated in FIG. 21. In another aspect, an optical filter 102 may be disposed separately from an R light source 101W serving as a white light source, as illustrated in FIG. 22.

However, the optical filter 102 is preferably interposed between the R light source 101W and a light guide 107, so that light emitted from the R light source 101W is transmitted through the optical filter 102. This is because in a case where part of the light emitted from the R light source 101W enters the light guide 107 without being transmitted through the optical filter 102, a line sensor 120 is unable to accurately read red components of an image of the document M.

Therefore, the size and arrangement position of the optical filter 102 are preferably configured on the basis of the directivity of the R light source 101W so that all the light emitted from the R light source 101W is transmitted through the optical filter 102.

Although the R light source 101W and the optical filter 102 have been used as an example in the description above, the configuration is not limited thereto, and may be applied to another combination of a light source (e.g., G light source 103W) and an optical filter.

[F. Fourth Embodiment—Light Source Including White Light Source and Optical Filter]

In the embodiments described above, the example of using a light source including a white light source and an optical filter as an R light source or a G light source has been described. In another aspect, a light source including a white light source and an optical filter that transmits blue may be used as a B light source.

An optical filter is configured such that a half-value width of a wavelength with respect to the maximum intensity of a spectral characteristic of light transmitted through the optical filter is wider than a half-value width of a wavelength with respect to the maximum intensity of a spectral characteristic of light from a light source other than the white light source. In this way, whichever R, G, or B light source includes a light source that includes a white light source and an optical filter, an image reading apparatus is able to improve the color reproducibility compared to the case where the monochromatic LEDs are used as the R, G, and B light sources for each.

Furthermore, in the embodiments above, the image reading apparatus is configured such that any one of the R, G, B light sources includes the light source including the white light source and the optical filter, but the configuration is not limited thereto. The image reading apparatus should at least be configured such that at least one of the R, G, and B light sources includes the light source including the white light source and the optical filter.

[G. Fifth Embodiment—Image Sensor]

In the embodiments above, although description has been given of a configuration using a line sensor (one-dimensional sensor) in which photoelectric conversion elements are arranged along the main scanning direction, the configuration is not limited thereto. For example, an area sensor (two-dimensional sensor) in which photoelectric conversion elements are arranged on the surface thereof may be used as an image sensor.

According to an embodiment of the present invention, an image reading apparatus is capable of obtaining, from an object being read, an image separated into each color, red, green, and blue, in a simpler configuration than before.

Although the present invention has been described and illustrated in detail, it is clearly understood that the same is by way of illustrated and example only and is not to be taken by way of limitation, the scope of the present invention being interpreted by terms of the appended claims. All changes which fall within the meaning and scope equivalent to the appended claims are intended to be embraced within the scope of the present invention.

What is claimed is:

1. An image reading apparatus, comprising:
   three or more light sources configured to each emit, to a document to be read, light having a spectral characteristic different from one another;
   a light sensor including a common light receiving surface configured to detect each light emitted from the three or more light sources and reflected from the document; and
   an image generator configured to cause the three or more light sources to be switched over in a predetermined order and emit the corresponding light, and generate an image read from the document on the basis of the order of switchover, a detection result in the light sensor, and the spectral characteristic of each light emitted from the three or more light sources, wherein
   at least one of the three or more light sources includes a white light source and an optical filter disposed in the white light source, and
   the optical filter is configured such that a full width of a wavelength with respect to a half-maximum intensity of the spectral characteristic of the emitted light after transmission through the optical filter is wider than the full width of a wavelength with respect to the half-maximum intensity of the spectral characteristic of the light emitted from at least one of the other light sources.

2. The image reading apparatus according to claim 1, further comprising:
   a superimposing light source configured to emit light having a spectral characteristic in which a wavelength at a maximum intensity thereof is within a wavelength range that the optical filter transmits, wherein
   the image generator causes not only the white light source but also the superimposing light source to be illuminated.

3. The image reading apparatus according to claim 2, wherein the white light source and the superimposing light source are arranged so as to be adjacent to one another.

4. The image reading apparatus according to claim 2, wherein the white light source and the superimposing light source are configured such that a maximum intensity of a spectral characteristic of light obtained by combining the light emitted and transmitted through the optical filter and the light emitted from the superimposing light source is substantially equal to the maximum intensity of the spectral characteristic of the light emitted from at least one of the other light sources.

5. The image reading apparatus according to claim 1, wherein the optical filter transmits light of at least 550 nm to 700 nm.

6. The image reading apparatus according to claim 1, wherein the white light source is configured such that an intensity thereof at least in a range from 550 nm to 700 nm exceeds a half of the maximum intensity of the light of at least one of the other light sources.

7. The image reading apparatus according to claim 1, wherein the optical filter transmits light of at least 500 nm to 580 nm.

8. The image reading apparatus according to claim 1, wherein the white light source is configured such that an intensity thereof at least in a range from 500 nm to 580 nm exceeds a half of the maximum intensity of the light of at least one of the other light sources.

9. The image reading apparatus according to claim 1, further comprising:
   a light guide configured to guide each light emitted from the three or more light sources to the document; and
   an image forming lens configured to cause each light emitted from the three or more light sources and reflected from the document to form an image on the light receiving surface.

10. The image reading apparatus according to claim 9, wherein the optical filter is interposed between the three or more light sources and the light guide.

11. The image reading apparatus according to claim 1, wherein the optical filter is disposed over a surface of the white light source.

12. An image reading apparatus, comprising:
    three light sources configured to generate light each including a wavelength component corresponding to red, green, or blue;
    a light sensor including a common light receiving surface configured to detect each light emitted, at different timing from one another, from the three light sources to a document to be read and then reflected from the document; and
    an image generator configured to cause the three light sources to be switched over in a predetermined order and emit the corresponding light, and generate an image read from the document on the basis of the order of switchover, a detection result in the light sensor, and a spectral characteristic of each light emitted from the three light sources, wherein
    among the three light sources, the light source configured to generate the light including the wavelength component corresponding to red is configured such that an intensity thereof at least in a range from 550 nm to 700 nm exceeds a half of a maximum intensity of the light of at least one of the other light sources.

13. An image reading apparatus, comprising:
    three light sources configured to generate light each including a wavelength component corresponding to red, green, or blue;
    a light sensor including a common light receiving surface configured to detect each light emitted, at different timing from one another, from the three light sources to a document to be read and then reflected from the document; and
    an image generator configured to cause the three light sources to be switched over in a predetermined order and emit the corresponding light, and generate an image read from the document on the basis of the order of switchover, a detection result in the light sensor, and a spectral characteristic of each light emitted from the three light sources, wherein
    among the three light sources, the light source configured to generate the light including the wavelength component corresponding to green is configured such that an intensity thereof at least in a range from 500 nm to 580 nm exceeds a half of a maximum intensity of the light of at least one of the other light sources.

* * * * *